US006046981A

United States Patent [19]
Ramamurthy et al.

[11] Patent Number: 6,046,981
[45] Date of Patent: Apr. 4, 2000

[54] MULTI-CLASS CONNECTION ADMISSION CONTROL METHOD FOR ASYNCHRONOUS TRANSFER MODE (ATM) SWITCHES

[75] Inventors: Gopalakrishnan Ramamurthy, Cranbury; Qiang Ren, Somerset, both of N.J.

[73] Assignee: NEC USA, Inc., Princeton, N.J.

[21] Appl. No.: 08/808,128

[22] Filed: Feb. 28, 1997

[51] Int. Cl.[7] .................................................. H04L 12/56
[52] U.S. Cl. ........................ 370/232; 370/412; 370/468
[58] Field of Search .................................. 370/230, 232, 370/233, 234, 468, 413, 414, 412

[56] References Cited

U.S. PATENT DOCUMENTS

| | | | |
|---|---|---|---|
| 5,347,511 | 9/1994 | Gun . | |
| 5,754,530 | 5/1998 | Awdeh et al. | 370/232 |
| 5,812,527 | 9/1998 | Kline et al. | 370/232 |
| 5,850,398 | 12/1998 | King, Jr. | 370/412 |
| 5,862,126 | 1/1999 | Shah et al. | 370/230 |

FOREIGN PATENT DOCUMENTS

WO 97/01895  1/1997  WIPO .

OTHER PUBLICATIONS

A. Elwalid et al, "Effective Bandwidth of General Markovian Traffic Sources and Admission Control of High Speed Networks", IEEE/ACM Trans. Networking, vol. 1, pp. 329–343, 1993.

R. Guerin et al, "Equivalent Capacity and Its Application to Bandwidth Allocation in High Speed Network", IEEE Journal on Selected Areas in Communications, vol. 9, pp. 968–981, 1991.

F.P. Kelly, "Effective Bandwidths at Multi–Type Queues", Queuing Systems, vol. 9, pp. 5–15, 1991.

R. J. Gibbens et al, "Effective Bandwidths for the Multi–type UAS Channel", Queuing Systems, vol. 9, pp. 17–28, 1991.

J.Y Hui, "Resource Allocation for Broadband Network", IEEE Journal on Selected Areas of Communications, vol. 6, pp. 1598–1608, 1988.

B. Mark et al, "Real–time Estimation of UPC Parameters for Arbitrary Traffic Sources in ATM Networks" Proc. INFO-COM'96, vol. 1, pp. 384–390, 1996.

J.W. Roberts et al, "Evaluating Buffer Requirements in an ATM Multiplexer", Proc. GLOBECOM'89, Dallas, 1989.

A. Elwalid et al, "A New Approach for Allocating Buffers and Bandwidth to Heterogeneous, Regulated Traffic In an ATM Node", IEEE Journal on Selected Areas in Communications, vol. 13, No. 6, pp. 1115–1127, Aug. 1995.

J. Hyman, et al., "MARS: The Magnet II Real–Time Scheduling Algorithm," COMPUTER COMMUNICATION REVIEW, Volume 21, No. 4, Sep. 1991, pp. 285–293.

R. Guérin, et al. "Equivalent Capacity and its Application to Bandwidth Allocation in High–Speed Networks," 8272 IEEE JOURNAL ON SELECTED AREAS IN COMMUNICATIONS, 9 (1991) Sep., No. 7, pp. 968–981.

*Primary Examiner*—Chi H. Pham
*Assistant Examiner*—Maikhanh Tran
*Attorney, Agent, or Firm*—Sughrue, Mion, Zinn, Macpeak & Seas, PLLC

[57] ABSTRACT

A multi-class connection admission control (CAC) method that supports cell loss and delay requirements. In this model-based CAC, the source traffic is described in terms of the usage parameter control (UPC) parameters. Through analysis and approximations, simple closed-form methods to calculate the bandwidth required to meet guarantees on quality of service (QoS) are used. In addition to being robust, the CAC achieves a high level of resource utilization and can be easily implemented for real-time admission control.

26 Claims, 10 Drawing Sheets

VBR SOURCE: MOBI MPEG SEQUENCE

| LINK CAPACITY / ADMISSION MECHANISM | 45 Mbps | 100 Mbps | 150 Mbps | 300 Mbps |
|---|---|---|---|---|
| SIMULATION | 4 | 9 | 14 | 28 |
| NEC MULTI-CLASS CAC | 3 | 8 | 12 | 25 |
| EFFECTIVE BW | 3 | 7 | 11 | 22 |
| PNNI | 2 | 5 | 8 | 17 |
| PEAK RATE | 2 | 5 | 8 | 17 |

FIG. 7

VBR SOURCE: FLOWER GARDEN MPEG SEQUENCE

| LINK CAPACITY / ADMISSION MECHANISM | 45 Mbps | 100 Mbps | 150 Mbps | 300 Mbps |
|---|---|---|---|---|
| SIMULATION | 8 | 17 | 30 | 64 |
| NEC MULTI-CLASS CAC | 4 | 9 | 16 | 43 |
| EFFECTIVE BW | 3 | 7 | 11 | 22 |
| PNNI | 3 | 7 | 12 | 36 |
| PEAK RATE | 3 | 7 | 10 | 21 |

FIG. 8

MULTI-CLASS CONNECTION ADMISSION CONTROL METHOD FOR ASYNCHRONOUS TRANSFER MODE (ATM) SWITCHES

TECHNICAL FIELD

This invention relates to the field of telecommunication and in particular to a method for multi-class connection admission control for Asynchronous Transfer Mode (ATM) switches.

DESCRIPTION OF THE PRIOR ART AND PROBLEM

Broadband networks based on the asynchronous transfer mode (ATM) must support multiple classes of services with widely different traffic characteristics and quality of service (QoS) requirements. To ensure that a promised QoS can be met, users must declare traffic characteristics using usage parameter control (UPC) parameters. The users must also declare their QoS expectations, which can be mapped to appropriate generic traffic classes supported by the ATM network. With the information provided by the users at connection setup time, the ATM network, through the use of a connection admission controller (CAC), determines whether the new request for a connection should be accepted or rejected. The determination made by the CAC to accept a new connection is based on the availability of resources (bandwidth and buffers) which ensures that the QoS requested by the user with a new connection can be guaranteed, without degrading the QoS of connections that have already been admitted to the network. These "resource requirements" are computed by the CAC based on the declared UPC parameters and their QoS expectations.

Present day ATM service architecture consists of the following five service classes: (1) constant bit rate (CBR), (2) real-time variable bit rate (rt-VBR), (3) non-real-time variable bit rate (nrt-VBR), (4) available bit rate (ABR) and (5) unspecified bit rate (UBR). The QoS parameters of particular interest are:

(1) Peak-to-peak cell delay variation (CDV) and maximum cell transfer delay (CTD); and (2) Cell loss ration (CLR).

Generally, the above QoS requirements are guaranteed in a probabilistic sense. The source traffic is characterized by the UPC descriptors ($\lambda_p, \lambda_s, B_s$) i.e., peak cell rate (PCR) $\lambda_p$, sustainable cell rate (SCR) $\lambda_s$ and the maximum burst size (MBS) $B_s$. As has been shown, the conformance of the source traffic to these UPC parameters can be achieved through shaping, using a dual leaky bucket at the source and a policing function at the network access.

The goal of the call admission is to simultaneously achieve two objectives, namely:

(1) Maximizing the resource utilization; and (2) Guaranteeing the promised QoS for all accepted connections.

Importantly, the CAC must operate in real time and the computational overhead must be consistent with the available processing capacity on the switch. Given the statistical nature of the offered traffic, the vague description of the traffic provided by the UPC parameters, the stringent requirements of QoS, and the need to maintain a reasonable level of resource utilization, it remains a significant challenge to develop an efficient and robust CAC.

The prior art has performed numerous studies on traffic modeling and queuing analysis as applied to connection admission control and resource allocation. Asymptotic approximations (See, for example, A. Elwalid and D. Mirtra "Effective Bandwidth of General Markovian Traffic Sources and Admission Control of High Speed Networks", *IEEE/ACM Trans. Networking*, Vol. 1, pp. 329–343, 1993; R. Guerin, H. Ahmadi and M. Nagshineh, "Equivalent Capacity and its Application to Bandwidth Allocation in High Speed Network", *IEEE Journal on Selected Areas in Communications*, Vol. 9, pp. 968–981, 1991; and F. P. Kelly, "Effective Bandwidths at Multi-type Queues", *Queueing Systems*, Vol. 9, pp.5–15, 1991), and recently large deviation methods (See, e.g., R. J. Gibbens and P. J. Hunt, "Effective Bandwidths for the Multi-type UAS Channel", Queueing Systems, Vol. 9, pp. 17–28, 1991; J. Y. Hui, "Resource Allocation for Broadband Network", *IEEE Journal on Selected Areas of Communications*, Vol.6, pp. 1598–1608, 1988; and B. Mark and G. Ramamurthy, "Real-time Estimation of UPC Parameters for Arbitrary Traffic Sources in ATM Networks", *Proc. INFOCOM'96*, Vol.1, pp.384–390, 1996), are widely adopted to analyze the underlying problem. Traffic model assumptions range from simple renewal models to complex semi-Markovian models. In most of these studies, the analysis either depends on restrictive and precise assumptions on traffic models (e.g., renewal models and exponential assumptions), or involves complex and computationally expensive procedures of matrix computations and solution of eigenvalues. Therefore, results based on such methods are not practical for real-time admission control schemes.

A number of connection admission control schemes using the UPC parameters have been proposed. A simple, prior-art CAC method is one that admits new connections based on peak rate allocation alone. For bursty traffic this simple method can lead to significant under-utilization. Additionally, and due to bunching at the cell level, the peak cell rate allocation may not be sufficient for some CBR connections with stringent QoS requirements such as small cell delay variations (See, for example, *Performance Evaluation and Design of Multi-Service Networks*, edited by J. W. Roberts, COST 224 project, 1992).

Another prior-art approach to CAC was described in an article entitled "Equivalent Capacity and its Application to Bandwidth Allocation in High Speed Network" which appeared in *IEEE Journal on Selected Areas in Communications*, Vol. 9, pp. 968–981, 1991. This method uses a two-state Markovian model, and computes a probability of the instantaneous aggregate rate exceeding the available capacity. If the probability is less than a target value, the connection is admitted. While this method is more efficient than that of the first example, it fails to take advantage of buffers, thereby leading to under-utilization.

A prior-art method which utilizes buffers is generally known as the "effective bandwidth" method and has been described in articles such as "Effective Bandwidth of General Markovian Traffic Sources and Admission Control of High Speed Networks", which appeared in *IEEE Journal on Selected Areas in Communications*, Vol. 9, No. 3, April 1991. The effective bandwidth method is reasonably accurate and efficient when the number of sources being multiplexed is small. However, when the number of multiplexed sources become large, it fails to take advantage of the benefits of statistical multiplexing. Further, in the UPC descriptors ($\lambda_p, \lambda_s, B_s$), $B_s$ represents the maximum burst size that can be transmitted at the peak rate $\lambda_p$. However, many of the models based on equivalent bandwidth take $B_s$ as the average burst size. These two factors lead to conservative estimates of the equivalent bandwidth, resulting in reduced efficiency.

Recently, Elwalid, Mitra and Wentworth in an article entitled "A New Approach for Allocating Buffers and Bandwidth to Heterogeneous Regulated Traffic in an ATM Node", which appeared in *IEEE Journal on Selected Areas in Communications*, Vol. 13, No. 6, pp. 1115–1127, August 1995, developed new models to calculate effective bandwidth for UPC-based traffic sources and obtained some simple solutions. Unfortunately, however, one still has to deal with a root-finding problem to take statistical multiplexing gain into these models.

Therefore, a continuing need exists in the art for methods which solve the above problems and provide a CAC exhibiting high link efficiency and low computational overhead thereby making it practical for real-time admission control.

SOLUTION AND SUMMARY OF THE INVENTION

The previously delineated problems are solved, and an advance is made over the prior art, according to our invention of a model-based, multi-class connection admission control policy for high speed ATM switches in which source traffic models are based upon declared UPC parameters from traffic sources. Advantageously, the CAC supports the QoS guarantees such as CDV and CLR.

Viewed from one aspect, the CAC method utilizes a free pool for bandwidth management in a multi-class heterogeneous traffic environment. For CBR connection admission control, an approximation is used which permits the management of heterogeneous CBR streams with reasonable CDVTs. For VBR connection admission control, the method utilizes a lossless multiplexing model for bandwidth allocation, providing great efficiency for a small number of connections. To achieve greater statistical multiplexing gain, the source model is modified to account for buffering effects. Subsequently, a more accurate approximation is used for CLR.

In addition to its robustness and efficiency, the CAC method can be implemented in real-time systems because of its computational simplicity. Advantageously, bandwidth calculations only require simple arithmetic computations and minimal physical memory requirements are imposed upon a computing system.

Further features and advantages of the present invention, as well as the structure and operation of various embodiments of the present invention, are described in detail below with reference to the accompanying drawings.

BRIEF DESCRIPTION OF THE DRAWINGS

The teachings of the present invention can be readily understood by considering the following detailed description in conjunction with the accompanying drawings, in which:

FIG. 7 shows the number of VBR streams which may be admitted by different CAC schemes;

FIG. 8 shows the number of VBR streams which may be admitted by different CAC streams;

DETAILED DESCRIPTION

A preferred embodiment of the invention will now be described while referring to the figures, several of which may be simultaneously referred to during the course of the following description.

Figure 1:
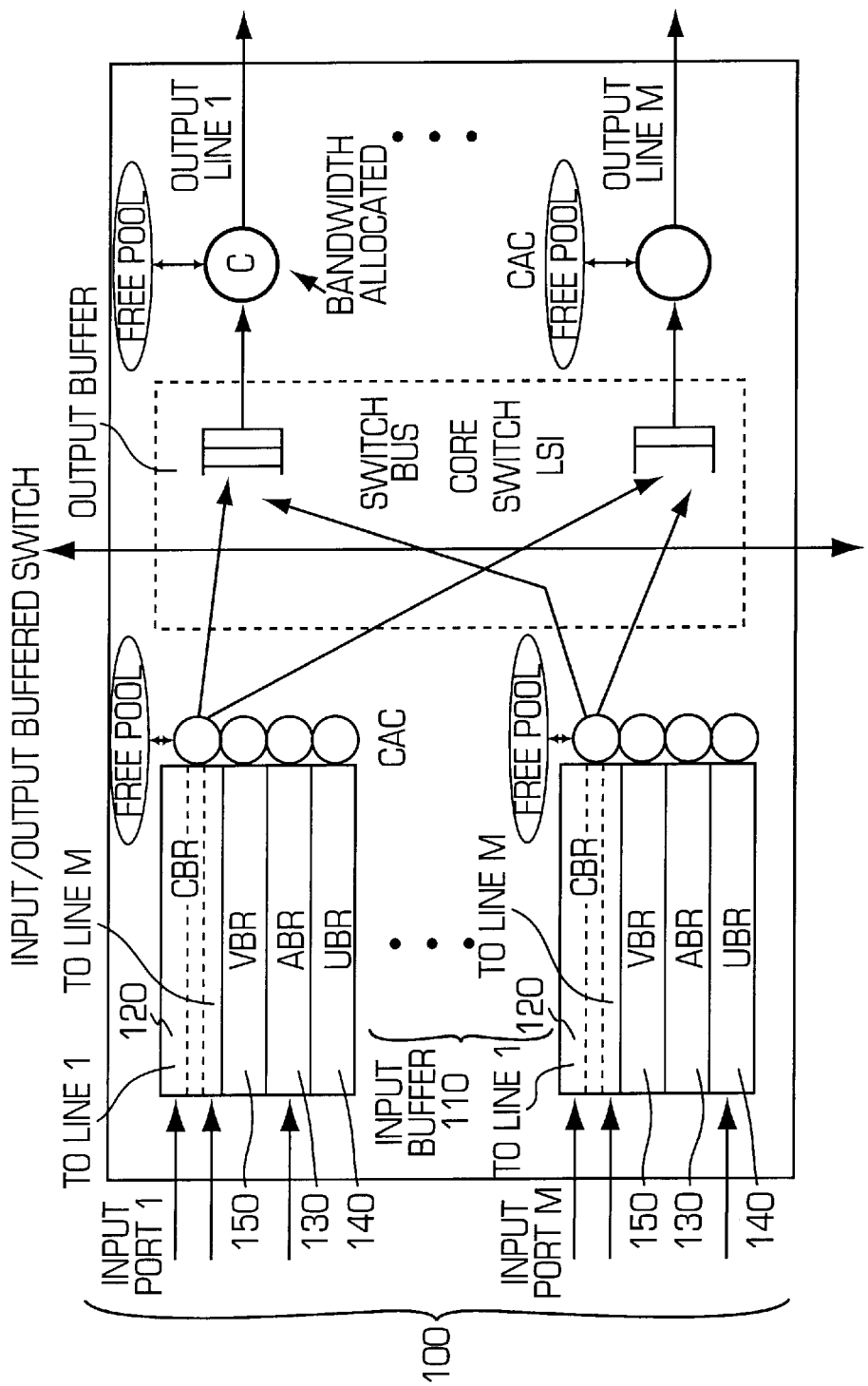
FIG. 1 shows an input/output buffered switch architecture for use with the invention of the present application.

We assume that the resources to be managed are bandwidth and buffers. For purposes of illustration we assume an M×M input/output buffered switch as depicted in FIG. 1. Those skilled in the art will quickly recognize that the principles developed here can be readily extended to other switch architectures as well.

At each input port 100, an input buffer, having an overall capacity $B_{total}$, is partitioned between different classes, i.e., $B_{cbr}$ 120, $B_{abr}$ 130, $B_{ubr}$ 140 and $B_{rt-vbr}$ 150 and $B_{nrt-vbr}$ 160. This partitioning reduces the interaction between classes. For each class, the buffers are again partitioned logically between the different output ports, using a policy of maximum sharing among all output ports, with minimum reservation for each output port. Assume that the total number of buffers at each input port for class k (k=1,2 ... K) is $B_k$ and there are M output ports. Class k traffic arriving at input port i and destined to output port j(i, j=1,2, M) have exclusive access to $B_{jk}^{min}$ buffers such that:

$$\sum_{j=1}^{M} B_{jk}^{min} \le B_k$$

Further, the maximum queue size of class k to output j will be limited to $B_{jk}^{max}$, where $$\sum_{j=1}^{M} B_{jk}^{max} \le B_k$$

The values of $B_{jk}^{min}$ and $B_{jk}^{max}$ for each class k (k=1,2 ... K) can be set by a network management system (NMS). For symmetrical loading $$B_{jk}^{max} \sim \frac{B_k}{\sqrt{M}}, j = 1, 2, \dots, M,$$

where $B_k$ is based on the traffic class and is set by the network management system.

Our inventive CAC uses a model-based approach to admit new calls. Based on the UPC parameters declared by a new connection request, the declared UPC parameters are mapped to an appropriate source traffic models, based on their declared UPC parameters. Using a queuing theoretic approach, the CAC then determines the required capacity or bandwidth to ensure the QoS objectives are met for the class.

We assume that $C_k(k=1,2, \dots, K)$ is the bandwidth logically allocated to existing connections of class k. There is a free pool of bandwidth of $C_f (0 \le C_f \le C_{link})$, where $$C_f = C_{link} - \sum_{k=1}^{K} C_k.$$

Figure 2:
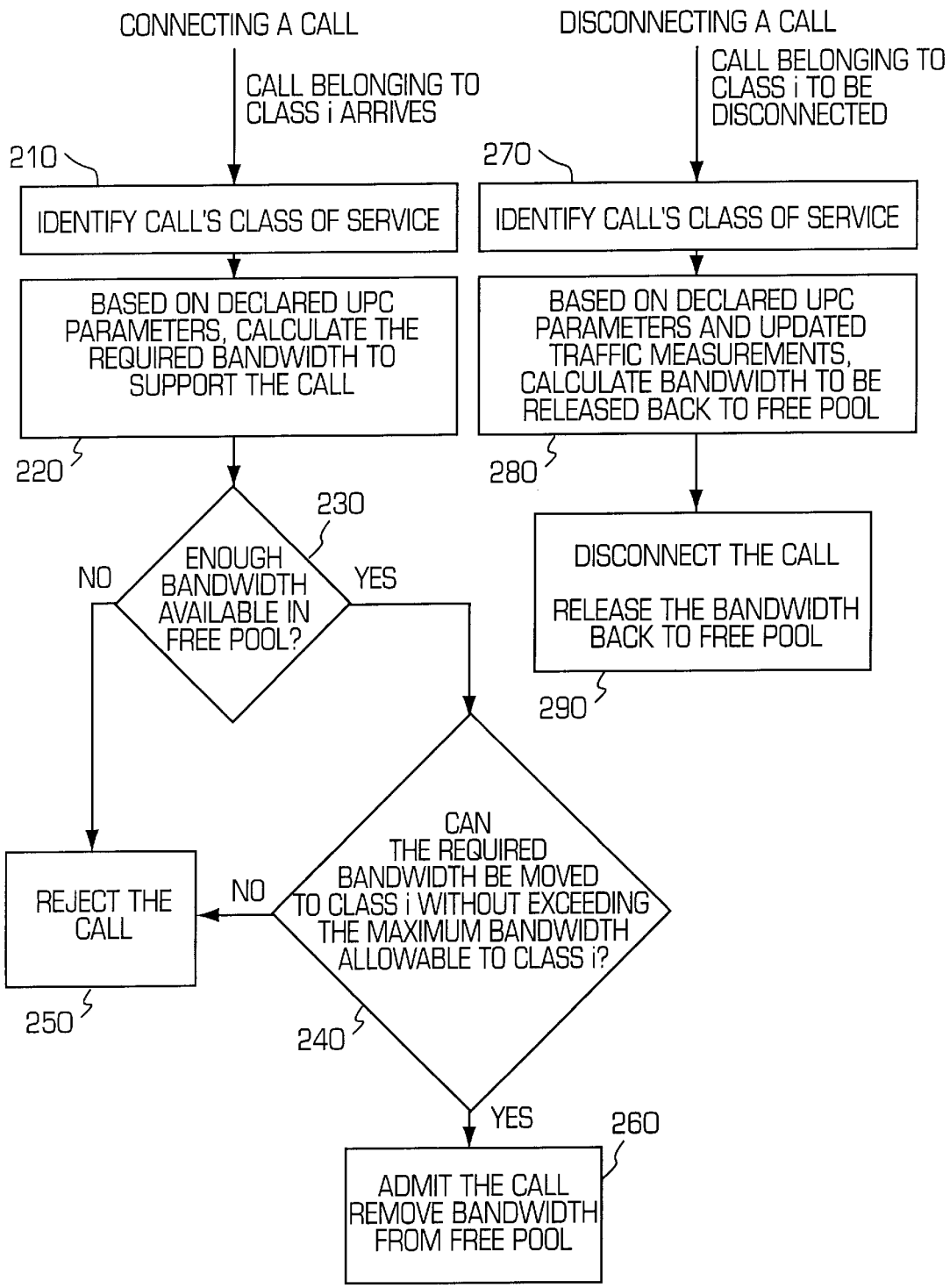
FIG. 2 is a flowchart depicting the CAC connecting or disconnecting a call.

With reference now to FIG. 2, there is shown a flow diagram of the CAC for the admission and tearing down of calls using our inventive method. Each time a new class k connection request arrives, the CAC first identifies the class of service 210. Next, it determines the amount of additional bandwidth that must be allocated to the class in question (i.e., class k) if this new connection is to be accepted with a guaranteed QoS 220. The connection is accepted if this additional bandwidth is available in the free pool 230, and the total bandwidth allocated to the given class k does not exceed the limit $C_k^{max}$ set by the network management system (NMS) 240. Otherwise, the connection is rejected 250. If the connection is accepted, the bandwidth available in the free pool is reduced accordingly 260. When a connection is disconnected, the class of service associated with the call is first determined 270, a bandwidth calculation is made to determine the amount of bandwidth to be released back to the free pool 280, and the call is subsequently disconnected and the calculated amount of bandwidth is returned to the free pool 290.

With further reference now to FIG. 2, note that the CAC only performs a logical allocation of bandwidth, and there is no strict partitioning or reservation of bandwidth. Thus, at the cell level, at any given instant, if a certain class of traffic does not make use of its allocated bandwidth, advantageously the unused bandwidth can be used by other classes.

For an input/output buffered switch, the CAC is exercised at both the input port and the output port. When a new connection request arrives at input port i, heading to output port j, the CAC calculates the amount of bandwidth needed to support the QoS of this connection, taking into account the connections that have already been accepted at port i and j. It then checks if this bandwidth is available from the free pool at input port i, as well as from the free pool at output port j. The connection is accepted only if the CAC can find enough bandwidth at both the input port and the output port in question. If the connection is accepted, an appropriate amount of bandwidth is removed from the free pool at both sides. Similarly, when a connection is disconnected, the bandwidth released by the connection (as calculated by the CAC) is returned to the free pool at both the input port and the output port.

Importantly, the CAC only performs a logical allocation of bandwidth to the various classes of traffic. Actual allocation is ensured by the scheduler. For purposes of illustration, we now assume a frame-based scheduling method to allocate bandwidth, and show later how to modify our CAC to accommodate the QoS with the frame-based scheduling.

In particular, suppose that $C_{link}$ is the link bandwidth and b is the number of bits per cell, the time to transmit one cell is given by $b/C_{link}$. We define a frame as consisting of $N_f$ time slots, where, during each time slot, one cell of b bits can be transmitted at the link speed $C_{link}$. Then, allocating a bandwidth of $C_k$ to class k is equivalent to assigning $N_k$ time slots to this class out of each frame, where $$n_k = \left[ N_f \times \frac{C_k}{C_{link}} \right]$$

Figure 10:
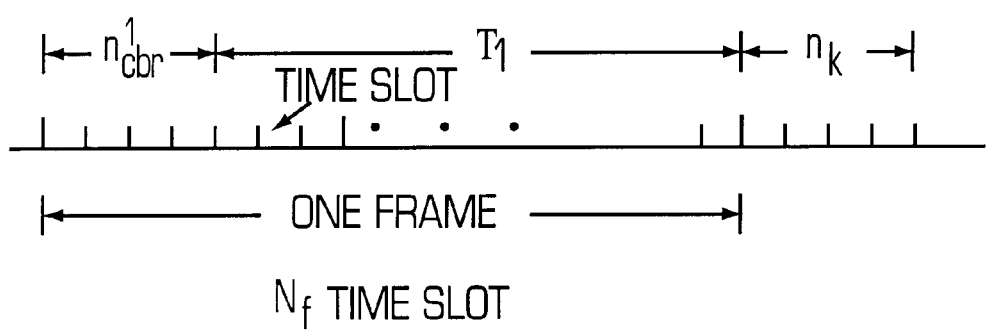
FIG. 10 is a time line showing bandwidth allocation from the CAC for frame-based scheduling.

This frame-based scheduling method for bandwidth allocation and cell transmission is depicted in FIG. 10.

Figure 3:
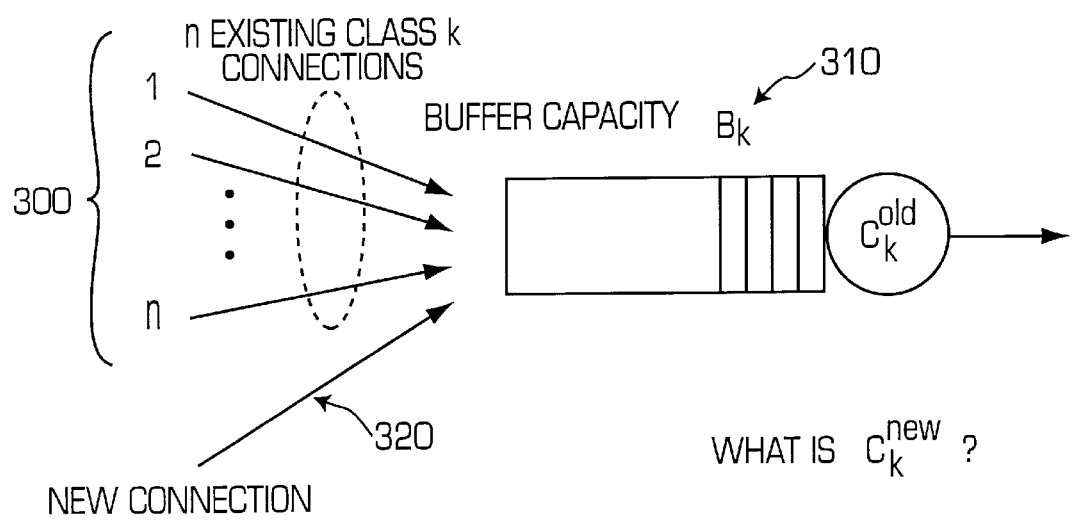
FIG. 3 shows a single server queue model for the CAC.

Since the CAC is executed for each class at each port of the switch, the multi-class connection admission control can be formulated as the following queuing problem:

As depicted in FIG. 3, there are n existing class k (i.e., VBR) connections 300, feeding to a single server queue with an allocated bandwidth or service rate of $C_k^{old}$ (Mbps) and a buffer space of $B_k$ (cells 310). The specified QoS guarantees (i.e., cell delay and loss) of these n connections are currently met by the system. When a new class k connection request arrives 320, the CAC has to determine the amount of new service rate or bandwidth $C_k^{new}$ that is needed to ensure the same QoS guarantees for the n+1 connections (including the new arrival) are met. The amount $\Delta C_k(=C_k^{new}-C_k^{old})$ is the additional bandwidth required if this new connection is to be admitted.

Importantly, the CAC scheme of the present application is designed to meet the following criteria:

(1) Robustness

By allocating the additional $\Delta C_k$, the specified QoS guarantee for the new and existing connections should be satisfied. This requires us to take into account the worst source traffic scenario.

(2) Link efficiency

Under the condition that the specified QoS guarantees are satisfied, the allocation of additional bandwidth $\Delta C_k$ to the class in questions should be as small as possible. This requires us to take into account the statistical multiplexing gain from the n+1 connections. That is, as each new connection is added in, the amount of additional bandwidth must progressively decrease.

(3) Computational load

In order for the CAC to be used in practice, the computation to determine $\Delta C_k$ needs to be performed in real time, say in a few milli-seconds or hundreds of micro-seconds. Hence, simple closed form solutions have to be found to calculate the additional bandwidth.

The QoS requirements that the CAC shall guarantee for cell loss is $$CLR < \epsilon_1, \quad (1)$$

where the CLR (cell loss ratio) is defined as the ratio of the number of total lost cells to the total number of cells that arrive. The QoS requirements for cell delay is $$Prob[CDV > t_{max}] < \epsilon_2, \quad (2)$$

where the CDV (cell delay variation) is defined as the difference between the inter-arrival time and the inter-departure time of consecutive cells from the same virtual connection. The CDV is also called daley jitter in other literatures. $t_{max}$ is the maximum CDV the connection can tolerate.

Note that the constraints in (1) and (2) are not end-to-end guarantees on QoS, but local to the given switch. The end-to-end constraints on QoS will be achieved by the routing function in conjunction with the NMS. Because all of the class k connections share the same FIFO (first-in-first-out) buffer, each of the connections shall have the same CDV and CLR guarantees as other connections (although they may have different CLR by setting different cell loss thresholds in the buffer O. That is, $t_{max}$, $\epsilon_1$ and $\epsilon_2$ are common to all class k connections routed through the given switch and the local QoS is managed and guaranteed on a class, rather than on individual connection basis. Although the CAC is class-based, the connections within each class are treated as heterogeneous sources, i.e., they may have different UPC parameters, $(\lambda_p, \lambda_s, B_s)$.

CAC for CBR Connections

CBR connections are characterized by their peak cell rates, i.e., their UPC parameters can be described $\lambda_s=\lambda_p$ and $B_s=1$. It is common to assume that the required CBR bandwidth is equal to the sum of their peak rates. However, if the CDV and CLR constraints are tight, the cell level congestion will require an allocation greater than the overall peak rate.

The waiting time distribution for a superposition of CBR connections can be analyzed via the $\Sigma D_i/D/1$ queue. In 1989, Roberts and Virtamo (See, e.g., J. W. Roberts and J. Virtamo, "Evaluating Buffer Requirements in an ATM Multiplexer", *Proc. GLOBECOM'89*, Dallas, 1989), studied the queue length distribution of a $\Sigma D_i/D/1$ queue and derived the upper and lower bounds. But the computations of these bounds involves complex root-finding solutions of polynomials. Later, these authors derived the upper and lower bounds with a different approximation method, which avoids the above root-finding problem. However, it still involves substantial computational complexities, especially when admitting and tearing down connections.

The present inventors have derived an exact equation for the waiting time distribution when N homogeneous CBR sources with peak rate $\lambda_p$ are multiplexed. Further, an efficient approximation for the waiting time distribution has been determined. This approximation while being very accurate, can significantly reduce the computation time. In the following, we outline the main equations of this approximation, which provide a foundation for the CBR CAC.

Consider the case when n CBR traffic streams, each with peak rate R (bits/sec), are multiplexed by a multiplexer with service rate $C_{cbr}$ (bits/sec) and infinite buffer space.

$$\text{Prob[Waiting time of an arriving cell} > t] = \exp\left[-2\left(\frac{t^2 C_{cbr}^2}{nb^2} + \frac{\left(1 - \frac{nR}{C_{cbr}}\right)t \cdot C_{cbr}}{b}\right)\right]$$

where b is the number of bits in an ATM cell.

Since the minimum waiting time of a cell is zero, the constraint on CDV can be upper-bound by a cell's waiting time distribution, i.e., in order to guarantee $\text{Prob}[CDV>t_{max}]<\epsilon_2$, it is sufficient to ensure $$\text{Prob[Waiting time of an arriving cell}>t_{max}]<\epsilon_2 \quad (4)$$

This probability can be computed from equation (3). The mean waiting time is therefore given by:

$$\overline{W} = \frac{b}{2C_{abr}}\left[B^{-1}\left(n-1, \frac{C_{cbr}}{nR}\right) - 1\right] \quad (5)$$

where B(a,b) is the Erlang loss formula.

Finally, to compute the cell loss ratio we use the relation between the queue length Q seen on arrival, the waiting time W and the service rate $C_{cbr}$, i.e.

$$Q \approx W^* C_{cbr}.$$

Thus we can approximate the cell loss probability by the overflow probability:

$$CLR \approx \text{Prob[A cell is blocked]}$$
$$\approx \text{Prob[Queue length on arrival} > B_{cbr}]$$
$$= \text{Prob}\left[\text{Waiting time seen by arriving cell} > \frac{B_{cbr}}{C_{cbr}}\right]$$
$$= \exp\left[-2\left(\frac{B_{cbr}^2}{n} + \left(1 - \frac{nR}{C_{cbr}}\right)B_{cbr}\right)\right]$$

where $B_{cbr}$ is the buffer capacity for the CBR queue.

Note that the above analysis only applies to the case when all n sources have the same peak rate R. As we have discussed earlier, exact solution and approximation for the case when CBR sources with different rates are multiplexed is still computationally intensive and not practical for real-time operations. However, we use a simple heuristic to address this problem. When heterogeneous CBR streams are multiplexed, the dominant parameters that affect the performance are the multiplexed load, the number of multiplexed streams, and the period of the lowest rate stream. Suppose that $R_b$ is the lowest rate among all CBR connections. If a CBR connection with a rate $m^*R_b$ is replaced by m CBR streams at rate $R_b$, a larger cell waiting time will result, because the superposition of m CBR streams can lead to bunched arrivals. In fact, we can show that the squared coefficient of variation of arrival process for the m multiplexed CBR streams is $$\frac{m-1}{m+1}.$$

For heterogeneous CBR connections, we first choose a basic rate as the lowest connection rate $R_b$ (e.g., 64 kbps). We then replace any given CBR connection of rate R by $j=R/R_b$ equivalent CBR sources of rate $R_b$. Therefore we may use (3) as an upper-bound for cell waiting time distribution when heterogeneous CBR traffic streams are multiplexed. This approximation, while being robust, is only marginally conservative.

Given $\epsilon_2$ and $t_{max}$, we can solve for the required bandwidth $C_{cbr}^{delay}$ from (3), to meet the delay constraint on CDV in (4)

$$C_{cbr}^{delay} = \frac{2*K*\left(a+K*R_b\frac{t_{max}}{b}\right)}{K+\sqrt{K^2\left(1+4*R_b\frac{t_{max}}{b}\right)+4a*K}} \frac{b}{t_{max}},$$

where $\alpha=-1.15*\log_{10}(\epsilon_2)$ and K is the total number of equivalent sources with rate $R_b$. The amount of bandwidth required to meet the cell loss constraint from (6), given $\epsilon_1$ and the buffer size $B_{cbr}$, is $$C_{cbr}^{loss} = \frac{K*R_b}{1+\frac{B_{cbr}}{K}-\frac{\beta}{B_{cbr}}} \quad (8)$$

where $\beta=-1.15*\log_{10}(\epsilon_1)$.

With the above analysis, the CAC procedure for admitting a new CBR connection with peak rate $\lambda_p^*$ is as follows.

1. Determine the equivalent number of basic rate CBR sources $j=\lambda_p^*/R_b$. CBR connections that have already been accepted are also expressed in terms of the equivalent number of basic rate sources. Let K be the total number of equivalent basic rate CBR sources, including the contribution from the new connection request.

$$K = j + \frac{\sum_{i=1}^{n} \lambda_p^i}{R_b},$$

where n is the number of CBR connections that are already admitted, $\lambda_p^i$ is the peak rate of CBR connection i (i=1, 2, . . . , n). Note that in our computation, neither j nor K is necessarily an integer.

2. Determine the additional capacity $\Delta_{cbr}$ that must be added to the current capacity of the CBR class, to ensure the QoS requirements of all CBR connections (including the new connection) are met.

$$\Delta_{cbr} = C_{cbr}^{new} - C_{cbr}^{old},$$

where $$C_{cbr}^{new} = \max(K^*R_b, C_{cbr}^{delay}, C_{cbr}^{loss}) \quad (9)$$

In (9), the first term is based on peak rate allocation. The second term ensures that the CDV constraint is met as in (7), and the third term ensures that the cell loss constraint is met as in (8). The square-root operation in (7) can be replaced by a Newton-Raphson iteration method or a table look-up.

3. If this total additional $\Delta_{cbr}$ is available in the free pool of bandwidth, and if the total capacity allocated to CBR class will not exceed the maximum limit $C_{cbr}^{max}$ set by the network management system, the connection is accepted and the amount of bandwidth available in the free pool is reduced by $\Delta_{cbr}$.

The procedure for a tear-down can be carried out in a similar way.

The complexity of implementation is very low for the CBR CAC. The only 0a I G X information we need to keep is the sum of peak rates of all existing connections, i.e., $$\sum_{i=1}^{n} \lambda_p^i,$$

and this quantity is updated every time when a CBR connection is admitted or disconnected.

A Frame-Based Scheduling for CBR Traffic

The above analysis assumes a single CBR queue with service capacity $C_{cbr}$. These results have to be modified to ensure the QoS requirement under frame-based scheduling.

We can find the number of time slots (out of each frame) assigned to CBR class through the following steps:

1. Find the required CBR capacity $C_{cbr}^1$ using Equation (9) so that the QoS requirements (1) and (2) are met.
2. Find the number of time slots, $n_{cbr}^1$, $$n_{cbr}^1 = \left\lceil N_f \frac{C_{cbr}^1}{C_{link}} \right\rceil. \quad (10)$$

3. Assuming that the $n_{cbr}^1$, slots are made available back to back at the beginning of each frame, we calculate the remaining time $T_1$ of the frame after serving $n_{cbr}^1$, cells:

$$T_1 = (N_f - n_{cbr}^1)\frac{b}{C_{link}}, \quad (11)$$

As shown in FIG. 10, CBR connections take the first $n_{cbr}^1$, consecutive time slots out of each frame. Thus for cells that arrive in the remaining time interval $T_1$, the additional average expected delay due to the frame-based scheduling is $T_1/2$.

4. Find new CBR capacity $C_{cbr}^2$ using Equation (9) so that the modified QoS requirement for delay $$\text{Prob}\left[CDV > \left(t_{max} - \frac{T_1}{2}\right)\right] < \varepsilon_2 \quad (12)$$

is satisfied.

5. Find the new number of time slots assigned to CBR class:

$$n_{cbr}^2 = \left\lceil \frac{C_{cbr}^2}{C_{link}} \right\rceil. \quad (13)$$

Note that if the $n_{cbr}^1$ slots are distributed uniformly over the frame, the latency due to the frame-based scheduling can be significantly reduced.

The number of time slots in each frame, $N_f$, is a design parameter. A small $N_f$ can limit the minimum bandwidth that can be allowed to a class as well as the granularity of the allocation. On the other hand, a large $N_f$ may produce a relatively large $T_1$ in (11) and therefore cause the over-allocation of $C_{cbr}^2$ by the CAC due to the more stringent QoS requirement in (12). From our studies, we find that $N_f$=32 to 48 provides a relatively good compromise.

CAC for VBR Connections

Sources whose short term average rates vary with time can be classified as variable bit rate (VBR) sources. Sources subscribing to the VBR class will specify their UPC descriptors $(\lambda_p, \lambda_s, B_s)$, where $\lambda_p \geq \lambda_s$, and $B_s \geq 1$. The QoS requirements are cell loss ratio (CLR) and cell delay variation (CDV):

CLR<$\epsilon_1$,

Prob[CDV>$t_{max}$]<$\epsilon_2$.

As is the case of CBR traffic, CDV can be determined via the waiting time distribution, which in turn can be related to the queue length distribution. The VBR CAC developed here can be applied to both real time and non-real time VBR classes. The values of $\epsilon_1$, $\epsilon_2$ and $t_{max}$ will be different for these two classes.

The proposed VBR CAC uses two multiplexer models based on the UPC descriptors $(\lambda_p, \lambda_s, B_s)$. One is a lossless multiplexing model that performs best when the number of multiplexed sources are small; the second is a statistical multiplexing model that performs best when the number of multiplexed sources are large. In both models, we use fluid flow processes. We combine these two models when the CAC has to make decision on VBR sources.

Equivalent Source Traffic Model

When a new VBR connection arrives, we assume that the traffic offered to the network is regulated at the source in accordance with the declared UPC parameters $(\lambda_p^*, \lambda_s^*, B_s^*)$ through a dual leaky bucket. The departure process of such a regulator is an "on/off" process with varying rates. It has been shown that a periodic "on/off" rate process with "on" and "off" periods given by $$T_{on}^* = \frac{B_s^*}{\lambda_p^*} \text{ and } T_{off}^* = \frac{B_s^*}{\lambda_p^*} \frac{(\lambda_p^* - \lambda_s^*)}{\lambda_s^*} \tag{14}$$

in many cases can be considered as the worst case source model in the sense of having the maximum steady-state cell loss probability. The probability such a source is in the "on" state is given by $$P_{on}^* = \frac{T_{on}^*}{T_{on}^* + T_{off}^*} = \frac{\lambda_s^*}{\lambda_p^*}. \tag{15}$$

Buffered Lossless Multiplexing Model

We first developed a buffered lossless multiplexing model based on the deterministic behavior of the "on/off" sources. This model is valid when the sources generate bursts that are significantly larger than the available buffers. Under such circumstances, the statistical multiplexing gain will be low. Because of the large burst size, the service class must be allocated an additional capacity that ensures the burst is not queued. Assume that n VBR connections have been admitted, where the i-th connection has UPC parameters $(\lambda_p^i, \lambda_s^i, B_s^i)$, i=1,2, . . . n. Let $C_{vbr}^{old}$ be the bandwidth currently allocated to the VBR class, supporting the n VBR connections.

Assume that $c^i$ is the equivalent bandwidth allocated to the i-th connection with UPC parameters $(\lambda_p^i, \lambda_s^i, B_s^i)$, and the "on" period $T_{on}^i$ as obtained from (14). The maximum queue accumulation $Q_i$ for this connection during an "on" period is $$Q_i = (\lambda_p^i - c^i)T_{on}^i = (\lambda_p^i - c)\frac{B_s^i}{\lambda_p^i}, \tag{16}$$

We make the simplifying assumption that the ratio between $Q_i$ and the overall buffer allocated for VBR traffic $B_{vbr}$, is same as the ratio between its burst size $B_s^i$ and the sum of the burst sizes of all n connections. That is $$\frac{Q_i}{B_{vbr}} = \frac{B_s^i}{\sum_{j=1}^{n} B_s^j}, i = 1, 2, \ldots, n. \tag{17}$$

To avoid any cell loss, it is sufficient that $$\sum_{i=1}^{n} Q_i \leq B_{vbr}. \tag{18}$$

Solving (16), (17), and (18) for $c^i$ and also noting that the bandwidth allocated to each connection should be at least equal to its sustainable rate $\lambda_s^i$ in order to keep queue stable, we have $$c^i = \max\left(\lambda_p^i\left(1 - \frac{B_{vbr}}{\sum_{i=1}^{n} B_s^i}\right), \lambda_s^i\right). \tag{19}$$

Therefore, the overall bandwidth required by these n connections under this lossless multiplexer model is $$\sum_{i=1}^{n} c^i.$$

If a new connection with UPC parameters $(\lambda_p^*, \lambda_s^*, B_s^*)$ has to be admitted, we can calculate an equivalent bandwidth, $c^i$, for each of the n+1 connections:

$$c^i = \max\left(\lambda_p^i\left(1 - \frac{B_{vbr}}{B_s^* + \sum_{i=1}^{n} B_s^i}\right), \lambda_s^i\right), i = 1, 2, \ldots, n+1. \tag{20}$$

Then the new overall bandwidth to be assigned to the VBR class (if we admit the new incoming connection) with QoS guarantee on CLR, is given by $C_{vbr}^{new}$:

$$C_{vbr}^{new} = \max\left(\left(\lambda_p^* + \sum_{i=1}^{n} \lambda_p^i\right)\left(1 - \frac{B_{vbr}}{B_s^* + \sum_{i=1}^{n} B_s^i}\right)^+, \lambda_s^* + \sum_{i=1}^{n} \lambda_s^i\right). \tag{21}$$

Now, the maximum waiting time t for cells from all connection is $t = B_{vbr}/C_{vbr}^{new}$. If $t \leq t_{max}$, then the QoS guarantee of CDV is satisfied as well if $C_{vbr}^{new}$ can be allocated to VBR traffic class. If $t > t_{max}$, we have to re-calculate $C_{vbr}^{new}$ by substituting $B_{vbr}$ in (21) with $\hat{B}_{vbr} = C_{vbr}^{new} * t_{max}$.

Therefore the additional bandwidth required to support this new connection is given by $$\delta_1 = C_{vbr}^{new} - C_{vbr}^{old}.$$

Notice that by allocating $C_{vbr}^{new}$ to VBR class, the system incurs no cell loss under the "on/off" model assumption. To implement this CAC, we only need to store one set of information for all existing VBR connections, i.e., the sum of peak rates $$\sum_{i=1}^{n} \lambda_p^i,$$

the sum of sustainable rates $$\sum_{i=1}^{n} \lambda_s^i$$

and the sum of burst sizes $$\sum_{i=1}^{n} B_s^i.$$

All these quantities are updated when a VBR connection is admitted or disconnected.

2. Modified Source Model

The above mechanism does not take into account the statistical multiplexing gain, but still results in efficient bandwidth allocation when the number of connections are relatively small and the burst sizes are large. However, when the number of connections are relatively large and the individual source intensity is small, the model is overly conservative. We thus use an alternative approach to achieve better statistical multiplexing gain.

It is well-known that the cell loss performance of a multiplexer depends on the maximum burst length generated by the source, with respect to the amount of buffering. The parameters derived for the "on/off" source, on the other hand, take into account only the ratio of the "on" times to the total cycle time and do not consider the burst size explicitly. This can lead to very conservative estimates for the required bandwidth.

Figure 4:
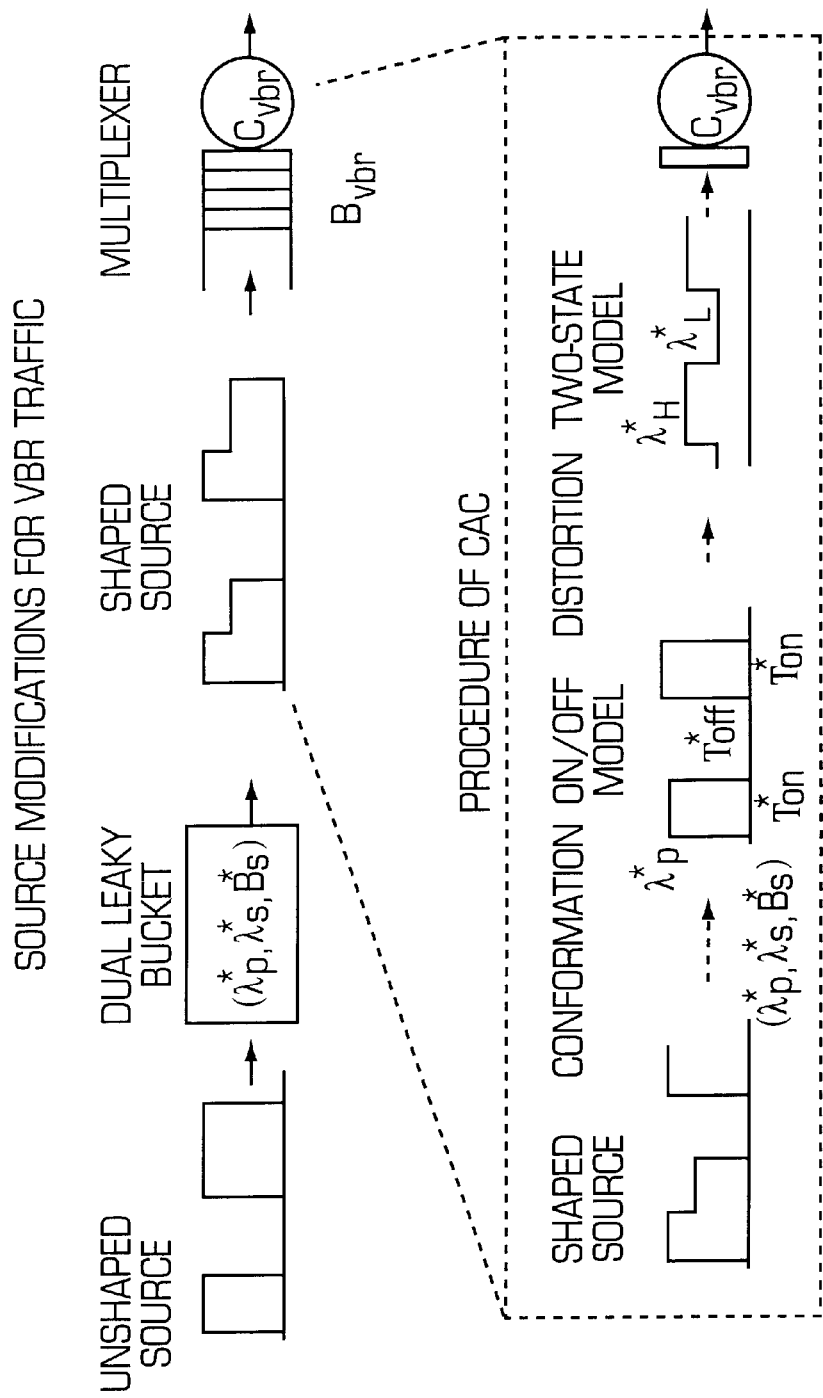
FIG. 4 shows source modifications for VBR connections.

In order to take into account the buffer space $B_{vbr}$ as well as the effects of burst length, we further modify the "on/off" source model in the previous text as follows. We define a basic time interval:

$$T_n = \frac{B_{vbr}}{2 * C_{vbr}^{max}}, \quad (22)$$

which can be viewed as the time scale to drain a buffer that is half-full. We then construct a new two-state model for the source. The two states are a high rate state with rate $\lambda_H^*$ and a low rate state with rate $\lambda_L^*$ (see FIG. 4). These states occur with probability $P_{on}^*$ and $(1-P_{on}^*)$ respectively. The high and the low rates are given by:

$$\lambda_H^* = \min\left(1, \frac{T_{on}^*}{T_N}\right)\lambda_p^* + \max\left(0.1 - \frac{T_{on}^*}{T_N}\right)\lambda_s^*$$

$$\lambda_H^* = \min\left(1, \frac{T_{on}^*}{T_N}\right)\lambda_p^* + \max\left(0, 1 - \frac{T_{on}^*}{T_N}\right)\lambda_s^*$$

$$\lambda_L^* = \max\left(0, 1 - \frac{T_{on}^*}{T_N}\right)\lambda_s^*$$

Thus, the sources with burst sizes that are small compared to the buffer size, are modeled by their average characteristics while sources whose $T_{on}$ are larger than $T_N$ are not significantly altered by this model. This step will reduce the bandwidth requirement for a source with a small burst size. Note that in the two models (14) and (23) the sources have the same average rate of $\lambda_s^*$.

From equation (23), as the burst size becomes large compared to the buffer size (i.e., as $T_{on}^*/T_N$ becomes large), $\lambda_H(\circ) \to \lambda_p^*$ and $\lambda_L(\downarrow) \to 0$. That is, for large burst sizes, the modified source model behaves like the worst case "on/off" model. However as the burst size becomes smaller, $T_{on}^*/T_N \to 0$ and $\lambda_H(\downarrow) \to \lambda_s^*$ and $\lambda_L(\downarrow) \to \lambda_s^*$. That is, the modified source model behavior approaches the average behavior of the sources, thus reducing variance. The arrows in parentheses indicate whether $\lambda_H$ and $\lambda_L$ increase or decrease.

Buffered Statistical Multiplexing Model

Based on the modified "on/off" source model in (22) and (23), we approximate the aggregate traffic stream R(t) of all VBR connections by a Gaussian process. We calculate the cell loss ratio defined by $$CLR \stackrel{def}{=} \frac{E[R(t)-C]^+}{E[R(t)]},$$

using integral approximations.

Let $\overline{M}_{old}$ and $\sigma_{old}^2$ be the mean and variance of the aggregate arrival process due to all existing VBR connections (i.e., before admitting the new connection). Let $\overline{M}_{new}$ and $\sigma_{new}^2$ be the mean and variance of the aggregate arrival process due to all admitted VBR connections after the new VBR connection is admitted. Then $$\overline{M}_{new} = \overline{M}_{old} + \lambda_s^* \quad (24)$$

$$\sigma_{new}^2 = \sigma_{old}^2 + (\lambda_H^* - \lambda_L^*)^2 P_{on}^*(1 - P_{on}^*).$$

Let $$\eta = \frac{\overline{M}_{new}\sqrt{2\pi}}{\sigma_{new}} \varepsilon, \quad (25)$$

and $$\zeta = \frac{C - \overline{M}_{new}}{\sigma_{new}}, \quad (26)$$

where $\epsilon = \min(\epsilon_1, \epsilon_2)$.

We can show that, given that R(t) is approximated by a Gaussian process with mean $\overline{M}_{new}$ and variance $\sigma_{new}^2$, solving the inequality $$CLR \stackrel{def}{=} \frac{E[R(t)-C]}{E[R(t)]} < \varepsilon$$

for C is equivalent to solving the following inequality for $\zeta$ $$\left(1 - \frac{2\zeta}{\zeta + \sqrt{\zeta^2 + 4}}\right) e^{-\frac{\zeta^2}{2}} < \eta. \quad (27)$$

This approximation in (27) is more accurate than the one proposed in [9], which is in fact, the Prob[R(t)>C], rather than CLR.

Solving (27) for $\zeta$, we have $$\zeta = \sqrt{2\left(-\log(-2\eta\log(\eta)) - \log\left(1 - \frac{\log(-2\log(\eta))}{1 - \log(\eta)}\right)\right)} \quad (28)$$

$$\approx 1.8 - 0.46\log_{10}(\eta)$$

where the $\log_{10}$ operation can be approximated.

From (26), the new overall VBR bandwidth required to support all VBR connections (including the new request) with QoS guarantee of CLR and CDV is given by $$C_{vbr}^{new} = \overline{M}_{new} + \zeta^* \sigma_{new}. \quad (29)$$

Therefore, the required additional bandwidth based on the statistical multiplexing model is given by $$\delta_2 = C_{vbr}^{new} - C_{vbr}^{old}.$$

Thus, combining two models, the additional bandwidth $\Delta_{vbr}$ is then given by $$\Delta_{vbr} = \min[\delta_1, \delta_2].$$

The new VBR connection is admitted if a capacity $\Delta_{vbr}$ is available in the free pool of bandwidth (i.e., $\Delta_{vbr} \leq C_f$) and $C_{vbr}^{new} \leq C_{vbr}^{max}$.

The complexity of using this statistical multiplexer model is low. We only need to store the mean and the variance of aggregate arrival rate, i.e., $\overline{M}_{old}$ and $\sigma_{old}^2$, and update them whenever a VBR connection is admitted or disconnected.

Note that the buffering effects in the statistical multiplexing model are taken into account by the modification of the source in (22) and (23). After this modification, we analyze a statistical multiplexer model without buffers.

In contrast to a prior-art CAC, the CAC model in our method is significantly more efficient since:
1. The prior-art CAC assumes an exponential "on/off" source with the mean burst size equal to $B_s^*$, which is overly conservative because $B_s^*$ is in reality the maximum burst size from the UPC parameters. In our model, we take this source characterization from specified UPC parameters and construct a worst case deterministic "on/off" source model. We further modify this model to reflect these facts. Therefore the same average rate a source with a smaller $B_s^*$ requires less bandwidth.
2. Unlike the prior-art's normal approximation, which does not use the buffer size, our model uses the buffer length through a modified source model.

Summary of the CAC Procedure for VBR Connections

When a new VBR connection arrives with UPC parameters $(\lambda_p^*, \lambda_s^*, B_s^*)$, we perform the following steps:
  Construct a fictitious "on/off" source model by using (14) and (15).
  Determine the required bandwidth $C_{vbr}^{new}$ based on the lossless multiplexer model:
    Calculate $C_{vbr}^{new}$ using (21).
    If the CDV constraint is not met, re-calculate $C_{vbr}^{new}$ using (21), replacing $B_{vbr}$ by $C_{vbr}^{new} * t_{max}$.
  Determine the additional bandwidth required to support the new connection:

$$\delta_1 = C_{vbr}^{new} - C_{vbr}^{old}.$$

Find out the required bandwidth $C_{vbr}^{new}$ based on the statistical multiplexer model:
    Construct a modified "on/off" source model using (22) and (23).
    Calculate $C_{vbr}^{new}$ using (24), (25), (28) and (29).
  Find out the additional bandwidth required to support the new connection:

$$\delta_2 = C_{vbr}^{new} - C_{vbr}^{old}.$$

The additional bandwidth required to support the new connection is $$\Delta_{vbr} = \min[\delta_1, \delta_2].$$

the new VBR connection is admitted if a capacity $\Delta_{vbr}$ is available in the free pool of bandwidth (i.e., $\Delta_{vbr} \leq C_{fp}$) and $C_{vbr}^{new} \leq C_{vbr}^{max}$.

Summary of the CAC Procedure for VBR Disconnections

When a VBR connection with UPC parameter $(\lambda_p^*, \lambda_s^*, B_s^*)$ to be disconnected, the following steps are performed:
  We first construct a fictitious "on/off" source model by using (14) and (15).
  Find out the required bandwidth $C_{vbr}^{new}$ based on the lossless multiplexer model:
    Calculate the bandwidth required for the remaining n connections (excluding the one to be disconnected), $$C_{vbr}^{new} = \max\left[\left(\sum_{i=1}^{n} \lambda_p^i\right) * \left(1 - \frac{B_{vbr}}{\sum_{i=1}^{n} B_s^i}\right), \sum_{i=1}^{n} \lambda_s^i\right]$$

If the CDV constraint is not met, re-calculate $C_{vbr}^{new}$ using the above procedure and replacing $B_{vbr}$ by $C_{vbr}^{new} * t_{max}$.

Find out the bandwidth to be released:

$$\delta_2 = C_{vbr}^{new} - C_{vbr}^{old}.$$

Find out the required bandwidth $C_{vbr}^{new}$ based on the statistical multiplexer model:
    Construct a modified "on/off" source model using (22) and (23).
    The new mean and variance of the aggregate arrival process due to all remaining connections are $$\overline{M}_{new} = \overline{M}_{old} - \lambda_s^*$$

$$\sigma_{new}^2 = \sigma_{old}^2 - (\lambda_H^* - \lambda_L^*)^2 P_{on}^* (1 - P_{on}^*). \quad (30)$$

Then $C_{vbr}^{new}$ can be computed similarly by using (25), (28) and (29).
  Find out the bandwidth to be released:

$$\delta_2 = \max[C_{vbr}^{old} - C_{vbr}^{new}, 0].$$

The amount of bandwidth that can be released is then given by $$\Delta_{vbr} = \max[\delta_1, \delta_2].$$

And is returned to the free pool.

CAC for ABR Connections

The ATM switches may explicitly compute the rate for each ABR virtual Channel (VC). The key parameters of interest for the ABR connection that have to be negotiated with the source are:
(1) Peak cell rate (PCR), the cell rate which the source may never exceed.
(2) Minimum cell rate (MCR), the cell rate at which the source is always allowed to send.
(3) Initial cell rate (ICR), the cell rate at which a source should send initially and after an idle period.
(4) Rate increase factor (RIF), controls the amount by which the cell transmission rate may increase upon receipt of an RM-cell.

Note that the ABR CAC shown here only guarantees MCR. Let $C_{mcr}^{max}$ be the maximum capacity that can be reserved for the ABR class to support MCR>0. The capacity available in the free pool for ABR service is:

$$C_f = C_{link} - C_{cbr} - C_{vbr} - C_{mcr},$$

where $C_{mcr}$ is service rate currently allocated to existing ABR connections.

MCR and RM Cell Bandwidth

When a request from a new ABR connection with MCR=$\lambda_{mcr}^*$ arrives, the call is accepted in an amount of bandwidth equal to $\lambda_{mcr}^*$ is available in the free pool (i.e., MCR* $\leq C_f$), and the total capacity reserved for ABR including the new request is less than $C_{mcr}^{max}$. In the event that the required MCR cannot be supported, the switch can either offer a lower value for MCR or set MCR=0.

An additional consideration or requirement for the ABR CAC is to reserve bandwidth for resource management (RM) cell transmission in the reverse direction. The RM cells carry congestion control information and thus have higher priority. Let $C_{mcr}^{max}$ be the maximum capacity available to the ABR class in the forward direction and K be the number of active ABR connections (including the new request). Given $\lambda_{mcr}^i$ and $N_{rm}^i$, i=1,2, . . . , k, where $N_{rm}^i$ is the number of data cells between successive RM cells, we can compute the required RM cell bandwidth in the reverse direction as $$C_{rm} = \left[\frac{C_{abr}^{max} - \sum_{i=1}^{K} \lambda_{mcr}^i}{K}\right] * \sum_{i=1}^{K} \frac{1}{n_{rm}^i} + \sum_{i=1}^{K} \frac{\lambda_{mcr}^i}{n_{rm}^i} \qquad (31)$$

Therefore, upon receiving a new request, we also have to check if there is enough bandwidth in the free pool for RM cells (i.e., if $C_{rm} < C_f$) in the reverse direction.

The average capacity for ABR, namely $$C_{abr} = C - \sum_{cbr} \lambda_p^{cbr} - \sum_{vbr} \lambda_s^{vbr}.$$

Note that this available capacity for ABR can be fluctuating with time.

Choice of Peak Cell Rate (PCR)

The peak cell rate for a new ABR connection can be set equal to one of the following:

$$PCR = C_{link} - \sum_{cbr} \lambda_p^{cbr} - \sum_{vbr} \lambda_s^{vbr}$$

Choice of Initial Cell Rate (ICR)

Let $B_{abr}$ be the total buffer capacity available for ABR service. Let the average number of sources that are likely to become active in one round-trip delay be m. Assume that when m users become active with a nominal rate $ICR_{nom}$ during a nominal round-trip delay $RTT_{nom}$, the resulting increase in queue length has to be restricted to $B_1$, where $B_0 + B_1 < B_{abr}$, and $B_0$ is the steady-state queue length. Thus $$m * ICR_{nom} * RTT_{nom} \leq B_1,$$

or equivalently $$ICR_{nom} = \frac{B_1}{m * RTT_{nom}}. \qquad (32)$$

The round-trip delays can vary between $$RTT_{min} \leq RTT_{nom} \leq RTT_{max}.$$

The switch will inform each user of the amount of buffers (TBE) it can use:

$$TBE = \frac{B_1}{m}.$$

If the round-trip delay of source i is the $RTT_i$ ($RTT_{min} \leq RTT_i \leq RTT_{max}$), source i will use an initial cell rate $$ICR_i = \frac{TBE}{RTT_i}.$$

Note that $ICR_i$ may be smaller (greater) than $ICR_{nom}$ if $RTT_i$ is greater (smaller) than $RTT_{nom}$.

Choice of Rate Increase Factor (RIF)

After one round-trip delay, the source can increase its rate from ICR to the advertised explicit rate (ER). Now the advertised ER, carried by the first returning RM cell, may not yet reflect the activity of the new user and hence may be larger than what the network can support.

Let $T_{det}$ be the delay in detecting an overload (due to the presence of the new source) that causes a new ER to be computed. During this time period since the m active users would be ramping their rates from their ICR to the advertised ER, the resulting increase in queue length, assuming a nominal initial cell rate of $ICR_{nom}$, must be limited to $$m * ICR_{nom} * \int_0^{T_{det}+RTT} e \frac{RIF \cdot PCR}{Nrm} dt \qquad (33)$$

such that $$B_0 + B_2 < B_{abr}$$

This gives the equation $$RIF \approx \frac{2 * Nrm\left(\frac{B_2}{m \cdot ICR} - T_{det} - RTT\right)}{(T_{det} + RTT)^2 \cdot PCR}$$

Solution of Eq. (34) gives the RIF that an ABR source can use.

Modification and Adaptation of CAC

CAC for Traffic Streams with CDVT

CDVT (cell delay variation tolerance) is the maximal CDV that is allowed in a traffic stream by the policing mechanism. In the current ATM forum traffic management specification, the CDVT is a mandatory parameter for any CBR connection traffic descriptor and is optional for VBR connections. The CDVT represents a traffic stream's rate fluctuation at the cell level. For a perfect CBR stream with peak cell rate $\lambda_p > 0$, cells arrive with a constant inter-arrival time $$\frac{1}{\lambda_p}.$$

But for a CBR stream with CDVT, the actual arrival epochs of cells may deviate from their targeted times. Thus, the actual cell rate of this stream may be higher than its normal peak rate $\lambda_p$ for a short time period and the increased short-term cell rate can be as high as the link rate $C_{link}$. For example, suppose that m consecutive cells of a CBR stream with normal peak rate $\lambda_p$ arrive back-to-back, effectively they come at a link rate $C_{link}$ for a period of $$\frac{m}{C_{link}}.$$

The maximum CDV experienced by the last cell of this block is $$m * \left(\frac{1}{\lambda_p} - \frac{1}{C_{link}}\right).$$

Similarly, for a VBR stream of peak rate $\lambda_p$, cells may arrive with an even higher rate (up to $C_{link}$) for a short period of time during a burst period, when cells are actually supposed to arrive every $$\frac{1}{\lambda_p}.$$

So, strictly speaking, a CBR or a VBR stream with CDVT is indeed a VBR stream at the cell level. But the time period of rate fluctuation caused by CDV (tens or hundreds of micro-seconds) is orders of magnitude shorter than the burst time period of VBR streams (several of tens of milli-seconds).

The traffic models of CBR and VBR sources for the CAC developed in previous sections do not take CDVT into account explicitly. Since these models are on the conservative side, the CAC may be used as is to accommodate traffic models with reasonable values of CDVT. In the following we outline a method to modify CAC to handle CBR and VBR traffic streams with CDVT>0.

Assume that a CBR or a VBR stream has UPC parameter $(\lambda_p^*, \lambda_s^*, B_s^*)$ and a CDVT=$t^*_{CDVT}$ for peak rate. The link rate is Clink and a buffer of B (i.e., B=$B_{cbr}$ for CBR traffic or B=$B_{vbr}$ for VBR traffic) is available. We want to map this stream to a stream with UPC parameters $(\tilde{\lambda}_p^*, \lambda_s^*, B_s^*)$, i.e. $\tilde{\lambda}_p > \lambda_p^*$ and CDVT=0.

We proceed as follows:

Find the maximal possible peak rate $\tilde{\lambda}_p^*$ and the corresponding maximal cell-clumping period $\tilde{T}_{on}^*$ as:

$$\tilde{\lambda}_p^* = \begin{cases} C_{link}, & \text{if } t^*_{CDVT} \geq \frac{1}{\lambda_p} - \frac{1}{C_{link}} \\ \dfrac{1}{\dfrac{1}{\lambda_p} - t^*_{CDVT}}, & \text{otherwise} \end{cases}$$

and $$\tilde{T}_{on}^* = \begin{cases} \dfrac{t^*_{CDVT}}{\dfrac{C_{link}}{\lambda_p} - 1}, & \text{if } t^*_{CDVT} \geq \frac{1}{\lambda_p} - \frac{1}{C_{link}} \\ \dfrac{1}{\lambda_p} - t^*_{CDVT} & \text{otherwise} \end{cases}$$

Note that $$\frac{t^*_{CDVT}}{\dfrac{1}{\lambda_p} - \dfrac{1}{C_{link}}} (= \tilde{\lambda}_p^* * \tilde{T}_{on}^*)$$

is the maximal number of cells that can clump together at the link rate, in case $$t^*_{CDVT} \geq \frac{1}{\lambda_p} - \frac{1}{C_{link}}.$$

If $$t^*_{CDVT} < \frac{1}{\lambda_p} - \frac{1}{C_{link}},$$

there is no cell-clumping at link rate $C_{link}$. This model captures the worst case behavior of a stream with CDVT=$t_{CDVT}^*$.

Let $\lambda_p^i$ and $\tilde{T}_{on}^i$, i=1,2, . . . n, be computed for all n existing connections from (35) and (36). Denote $\tilde{B}_p^i = \lambda_p^{i*}$ $\tilde{T}_{on}^i$ the maximal number of cells that can clump together. We store the following information $$\sum_{i=1}^{n} \tilde{\lambda}_p^i, \sum_{i=1}^{n} \lambda_p^i, \sum_{i=1}^{n} \tilde{B}_p^i.$$

Then, the modified new peak rate for the incoming connection is computed as $$\hat{\lambda}_p^* = \qquad (37)$$

$$\begin{cases} \dfrac{a}{a - t_{CDVT}} \lambda_p^*, & \text{if } \left(\tilde{\lambda}_p^* + \sum_{i=1}^{n} \tilde{\lambda}_p^i\right) * \left(1 - \dfrac{B}{\tilde{B}_p^* + \sum\limits_{i=1}^{n} \tilde{B}_p^i}\right) > \left(\lambda_p^* + \sum_{i=1}^{n} \lambda_p^i\right), \\ \lambda_p^*, & \text{otherwise} \end{cases}$$

Where α=6.625 milli-second, the inter-arrival time of a 64 kbps voice connection. We then replace the original UP parameters $(\lambda_p^*, \lambda_s^*, B_s^*)$ by $(\hat{\lambda}_p^*, \lambda_s^*, B_s^*)$. Whenever a connection is admitted or disconnected, we update the quantities $$\sum_{i=1}^{n} \tilde{\lambda}_p^i, \sum_{i=1}^{n} \lambda_p^i, \text{ and } \sum_{i=1}^{n} \tilde{B}_p^i.$$

Measurement-Based Dynamic CAC

The CAC we have presented in the previous sections makes decisions based on the declared UPC descriptors from sources. In order to guarantee QoS and achieve robust CAC performance, worst-case traffic models have to be assumed when calculating the required bandwidth. Due to this worst-case traffic assumption, a lower utilization may result, especially when a large portion of traffic are VBR connections. In an effort to improve the network utilization, measure-based connection admission control schemes have been studied and we now show how the CAC for VBR connections can be modified to take advantage of measurements.

The modified "on/off" VBR source model is a worst-case source model, based on the declared UPC parameters. If the arrival process of admitted connection can be monitored, the values of $\overline{M}_{old}$ and $\sigma_{old}^2$ can be obtained from a combination of measurements and declared UPC parameters. This will improve the efficiency of the CAC further. For example, Eq. (24) can be written as $$\overline{M}_{new} = k\overline{M}_{old}(cac) + (1-k)\overline{M}_{old}(mes) + \lambda_s^*, \sigma_{new}^2 = k\sigma_{old}^2(mes) + (\lambda_H^*)^2 P_{on}^*(1 - P_{on}^*), \qquad (38)$$

where $0 \leq k \leq 1$, $\overline{M}_{old}(cac)$ and $\sigma_{old}^2(cac)$ are the mean and variance in the aggregate arrival rate of existing connections as computed from the declared UPC parameters, and $\overline{M}_{old}(mes)$ and $\sigma_{old}^2(mes)$ are the mean and variance in the aggregate arrival rate of existing connections obtained from measurements. The parameter k is called a smoothing parameter.

The measurement includes the mean and variance of arrival rate and cell loss ratio (CLR), which are based on statistics collected during fixed time intervals. We call these time intervals the measurement periods. All statistics are updated after each measurement period. The measurement period can range from hundreds of milli-seconds to tens of seconds.

The parameter k is subject to tuning by the NMS. When k=1, the dynamic CAC assigns bandwidth based on source UPC parameters. This may result in over-assignment of bandwidth due to conservative UPC parameters (notice that the substain rate $\lambda_2$>average rate $\lambda_a$). On the other hand, when k=0, the dynamic CAC assigns bandwidth solely based on the measured statistics. This may mis-judge the bandwidth requirements by the connections due to the potential inaccuracy of measurement data. Therefore we need to find an appropriate smoothing parameter k for the dynamic CAC.

In the following, we outline our procedure for dynamically adjusting the smooth parameter k:

Let $A_1, A_2, \ldots, A_n, A_{n+1}, \ldots$, be the measurement periods, $CLR^n_{mes}$ be the cell loss ratio measured during period $A_n$ and $k_n$ be the smoothing parameter chosen after period $A_n$.

Let $CLR_{tar}$ be the QoS required by the connections and $\epsilon<1, \alpha, \beta>1$.

1. Set k=1 initially.
2. After each measurement period $A_i$, $$k_i = \begin{cases} \max(a_1, k_{i-1}/\alpha), & \text{if } \frac{CLR^i_{mes}}{CLR_{tar}} < \epsilon, \\ \min(a_2, \beta*k_{i-1}), & \text{if } \frac{CLR^i_{mes}}{CLR_{tar}} \geq \epsilon \end{cases} \quad (39)$$

The constants $\epsilon, \alpha, \beta, a_1$, and $a_2$ are chosen by the NMS.

EXAMPLES

Figure 5:
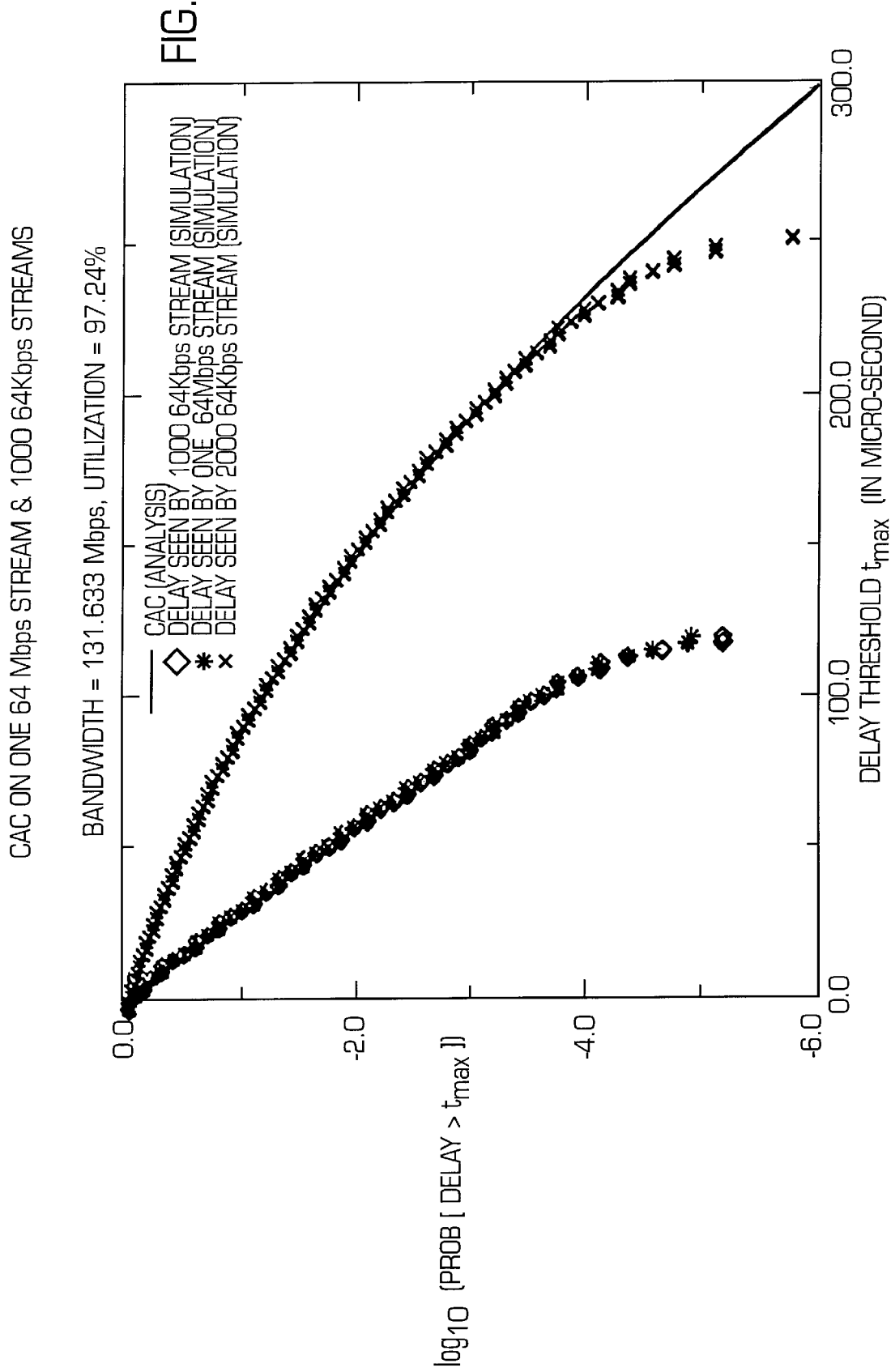
FIG. 5 shows the complementary waiting time distribution of a superposed stream of one 64 Mbps stream and 1000 64 Kbps streams.
Figure 6:
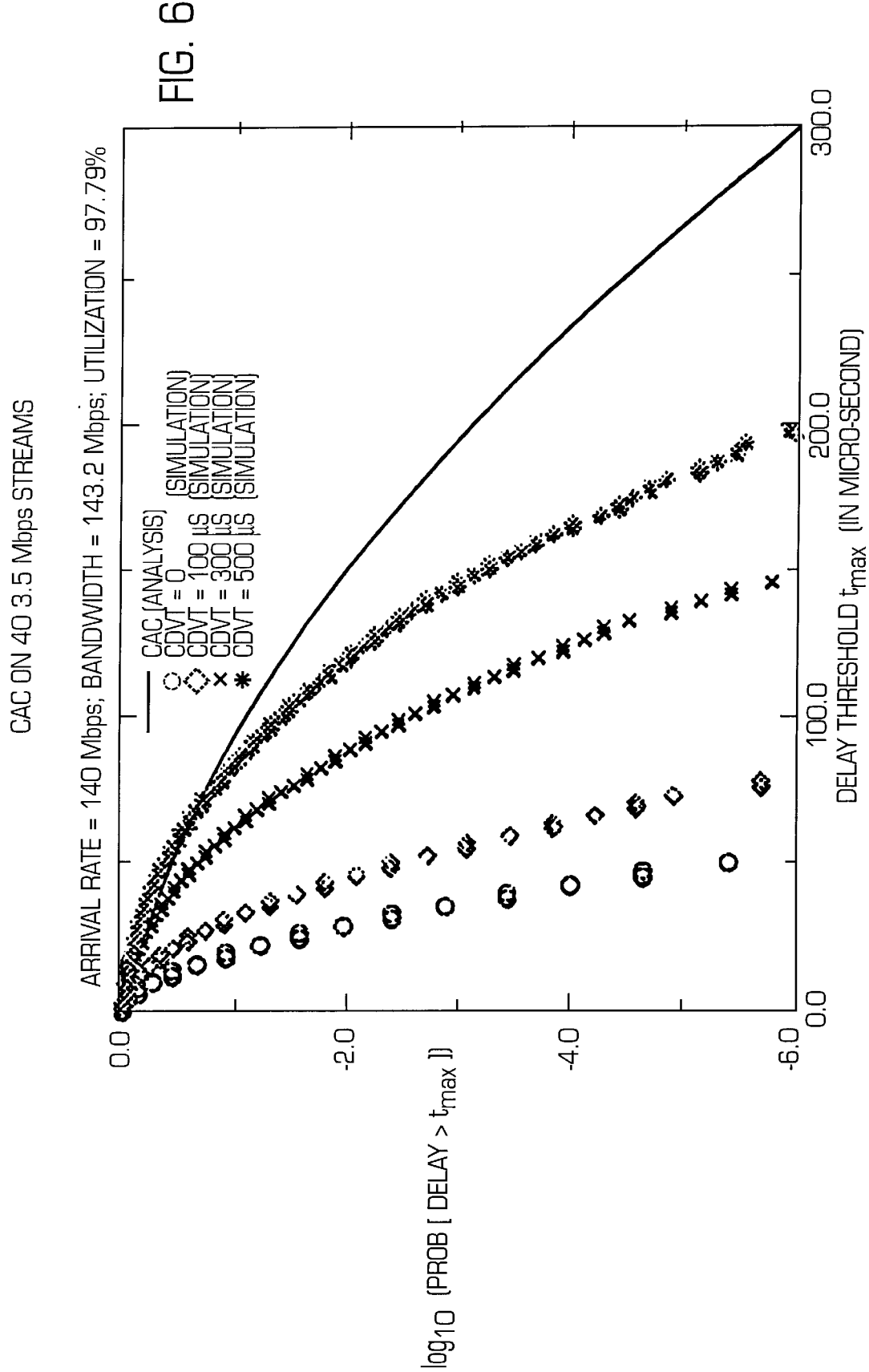
FIG. 6 shows the complementary waiting time distribution of a superposed stream of 40, 3.5 Mbps streams.

The examples shown in FIGS. 5 and 6 show our CAC for CBR connections. In the example of FIG. 5, we show the complementary waiting time distributions when 1000 connections of 64 Kbps CBR streams are multiplexed with one 64 Mbps CBR stream, with the requirement that the $10^{-6}$ quartile of the peak to peak CDV be less than 300 microseconds. Note that allocation based on peak rates will require 128 Mbps. From FIG. 5, we observe the following:

1. If the high speed 64 Mbps CBR stream is replaced by 1000 equivalent 64 Kbps streams, the resulting complementary waiting time distribution for 2000 connections of 64 Kbps streams as obtained from simulation is very close to the waiting time distribution computed in analysis (3).

2. The actual complementary waiting time distribution seen by the 64 Kbps CBR streams and the 64 Mbps CBR stream (from simulation), has a smaller tail probability compared to the analytic approximation used for the multiplexing of heterogeneous CBR streams.

3. The CAC allocates a capacity of 131.633 Mbps to ensure the required CDV constraint of 300 micro-seconds at the $10^{-6}$ quartile is met. From simulation, the actual capacity required to meet this QoS constraint is 129.3 Mbps. Thus the CAC over allocates by about 2%. The system has a utilization of 97.24%. Peak rate allocation would have required 128 Mbps, which is not sufficient to guarantee 300 microseconds CDV requirement.

In FIG. 6, we show the complementary waiting time distributions of 40 connections of 3.5 Mbps CBR streams, with the constraint that the $10^{-6}$ quartile of the peak to peak CDV is less than 300 micro-seconds. The multiplexed stream is equivalent to 2188 CBR connections of 64 Kbps (i.e., we treat these 40 connections as heterogeneous traffic). From the CAC, we find that the required bandwidth is 143.2 Mbps to support the required QoS, resulting in a utilization of 97.8%. With this amount of bandwidth, the actual complementary waiting time distribution obtained from simulation (plotted as circles) is smaller than the one obtained by the CAC (plotted as solid line). However, the over-allocation of bandwidth by the CAC is less than 3%. The plot also shows the complementary waiting time distribution for CDVT>0. The complementary waiting time distributions get progressively worse when the CDVT of the arriving stream increases. Nevertheless, the CAC only marginally over-allocates bandwidth, and yet meets the CDV constrain for all CBR connections with reasonable values of CDVT (up to 500 micro-seconds).

The two examples in FIGS. 7 and 8 show the performance of the CAC for VBR connections. In the example of FIG. 7, the VBR source is an MPEG-1 coded sequence for a mobile, "MOBI" sequence. This empirical data sequence has a peak cell rate of 17.38 Mbps and an average cell rate of 8.53 Mbps. We can choose UPC parameters ($\lambda_p$=17.38 Mbps, $\lambda_s$=11.87 Mbps, $B_s$=83 cells) to characterize the MOBI sequence. We consider a single server queue with a buffer space of 500 cells and a QoS constraint: CLR<$10^{-5}$. With further reference to FIG. 7, given the above UPC parameters for the MOBI sequence and the different capacities for the server (i.e., $C_{vbr}$=45 Mbps, 100 Mbps, 150 Mbps, and 300 Mbps), we can show the maximum number of MOBI sequences that can be admitted without violating the CLR requirements. We then compare the results of our CAC to the results from other connection admission control policies in the literature as well as the results from simulations. From this Figure, it should be apparent to those skilled in the art that the inventive method developed here is more efficient than CAC's shown in the literature, while still being robust.

In the example shown in FIG. 8, a more bursty MPEG-1 coded sequence commonly called the "flower garden" is used. This sequence has a peak cell rate of 13.91 Mbps and an average rate of 3.1 Mbps. The UPC parameters we chose for this sequence are $\lambda_p$=13.91 Mbps, $\lambda_s$=3.6 Mbps, $B_s$=1479 cells. With same QoS requirements as for the MOBI sequence, we can see from FIG. 8 that the CAC is again more efficient than the other three CAC's. However, the CAC performs conservatively when compared to the number of connections that can be actually admitted. This is an inherent problem of model-based CACs. If one ensures that the CAC is robust, then reduced utilization follows.

Figure 9:
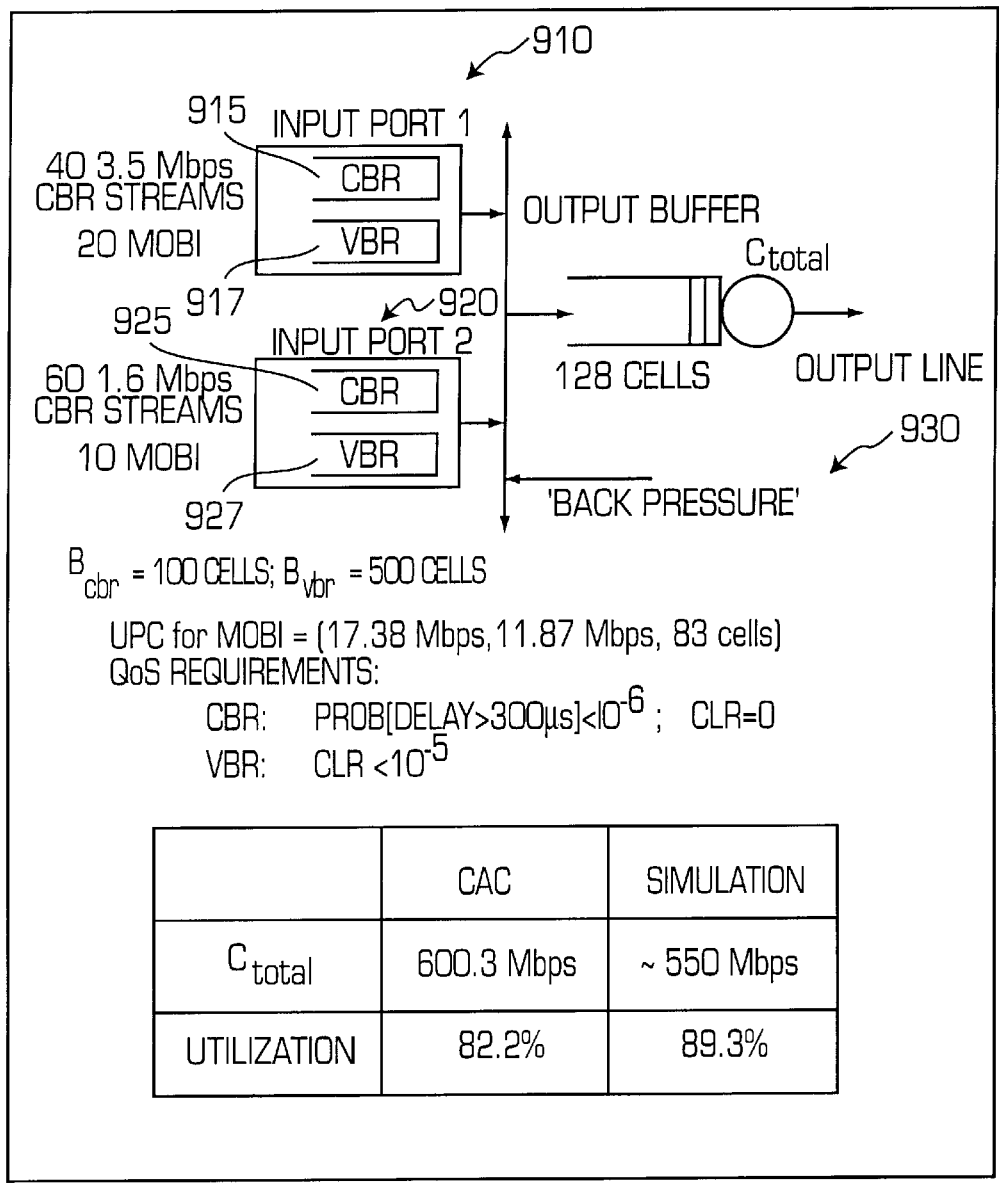
FIG. 9 shows the performance of the CAC for mixed CBR and VBR connections according to the teachings of the present invention.

Finally, with reference to FIG. 9, there is shown two input ports (910, 920) with traffic streams directed to certain output port(s). Each input port has two separate buffers one for CBR (915, 925) connections (100 cells) and another for VBR (917, 927) connections (500 cells). The queue of CBR connections has a higher service priority over the queue for VBR connections within each input port. The output port has an output buffer of 128 cells and serves the two input ports in a work-conserving, round-robin manner. If the output buffer is full, a "back pressure signal" 930 is sent back to stop cell transmission from input ports. The cells are discarded at the input ports if the input buffers are full. As depicted in this Figure, we have 40, 3.5 Mbps CBR streams and 20 MOBI VBR sequences feeding to the first input port, and 60 1.6 Mbps CBR streams and 10 MOBI VBR sequences feeding the second input port. The UPC parameters for the MOBI sequences are $\lambda_p$=17.38 Mbps, $\lambda_s$=11.87 Mbps, $B_s$=83 cells. The required QoS are Prob[CDV>300 $\mu$s]<$10^{-6}$ and CLR=0 for CBR connections and CLR<$10^{-5}$ for VBR connections. Using our inventive CACs, the overall required bandwidth $C_{total}$=600.3 Mbps, i.e., 143.2 Mbps for 40 3.5 Mbps CBR streams and 237.4 Mbps for 20 MOBI sequences. The average overall traffic load is 493. 4 Mbps. To achieve the required QoS stated above, about 550 Mbps bandwidth is actually required. Thus, the bandwidth allocation by the CAC has a system utilization of 82.2% (defined as the ratio of the offered traffic load to the required bandwidth computed by the CAC), and the maximal efficiency the system can achieve without violating the QoS is 89.3% (defined as the ratio of the offered traffic load to the required bandwidth found from simulations)

While there has been described and illustrated a method of providing multi-class connection admission control for high speed ATM switches and networks, it will be apparent to those skilled in the art that modifications and variations are possible without deviating from the broad principle and spirit of the invention which shall be limited solely by the scope of the claims appended hereto.

What is claimed is:

1. A multi-class connection admission control method for admitting a new constant bit rate (CBR) connection to an ATM switch situated within a telecommunications network, said method comprising:

a first step of converting heterogeneous variable rate CBR connections into a number of homogeneous CBR connections, each of which has a same rate, called the basic rate;

a second step of using an algorithm to compute an additional capacity that must be added to a current capacity of a particular CBR class such that all quality of service (QoS) requirements for all CBR connections including existing CBR connections and a new incoming CBR connection are met;

wherein said quality of service requirements include a stability requirement, a cell delay variation (CDV) requirement and a cell loss ratio (CLR) requirement.

2. The multi-class connection admission control method according to claim 1 wherein said additional capacity is obtained according to the following relationship:

$$j = \lambda_p^* / R_b,$$

where $\lambda_p^*$ is a peak bit rate for the new connection and $R_b$ is the bit rate of the equivalent sources; and K, the total number of equivalent basic rate CBR sources, including the contribution from the new connection is determined according to:

$$K = j + \frac{\sum_{i=1}^{n} \lambda_p^i}{R_b},$$

where n is the number of CBR connections that are already admitted by the switch and $\lambda_p^i$ is the peak bit rate for the CBR connection i (i=1, 2, . . . n).

3. The multi-class connection admission control method according to claim 2 wherein said additional capacity, $\Delta_{cbr}$, is determined according to the following relationship:

$$\Delta_{cbr} = C_{cbr}^{new} - C_{cbr}^{old},$$

wherein $C_{cbr}^{new}$ is the capacity required for the particular CBR class after the new connection is accepted and $C_{cbr}^{old}$, is the capacity of the particular CBR class before the new connection is accepted and $$C_{cbr}^{new} = \max(K * R_b, C_{cbr}^{delay}, C_{cbr}^{loss})$$

wherein $$C_{cbr}^{delay} = \frac{2 * K * \left(a + K * R_b \frac{t_{max}}{b}\right)}{K + \sqrt{K^2 \left(1 + 4 * R_b \frac{t_{max}}{b}\right) + 4a * K}} \frac{b}{t_{max}},$$

and $\alpha = -1.15 * \log_{10}(\epsilon_2)$, K is the total number of equivalent sources with a rate $R_b$ and $$C_{cbr}^{loss} = \frac{K * R_b}{1 + \frac{B_{cbr}}{K} - \frac{\beta}{B_{cbr}}}$$

such that the QoS requirements of all CBR connections, including the new connection, are met.

4. The multi-class connection admission control method according to claim 1 further comprising the step of:

determining a sum of the peak rates for all existing connections according to the following:

$$\sum_{i=1}^{n} \lambda_p^i.$$

5. A multi-class connection admission control method for admitting a new constant bit rate (CBR) connection to an ATM switch supporting a plurality of generic traffic classes, said switch having a plurality of inputs and a plurality of outputs;

a plurality of input buffers, connected to said input ports and said output ports wherein said input buffers are further divided into a plurality of buffer regions such that there is a particular buffer region associated with a particular one of said plurality of traffic classes and each one of said particular buffer regions are further divided into sub-regions, such that there is a particular sub-region within each buffer region associated with a particular input;

a free pool of buffers connected to said input buffers; and a connection admission controller for managing said buffers and said free pool of buffers;

said method comprising:

a first step of determining an equivalent number of basic rate CBR sources admitted to the ATM switch;

a second step of determining any additional capacity that must be added to a current capacity of a particular CBR class such that quality of service (QoS) requirements for all CBR connections are met;

accepting the new connection, if the additional capacity is available in a free pool of available capacity and the total capacity allocated to the particular CBR class does not exceed a maximum capacity limit for this particular CBR class established by a network management system; and reducing the free pool of available capacity by amount of additional capacity added to the current capacity for the particular CBR class.

6. The multi-class connection admission control method according to claim 5 wherein said additional capacity is obtained according to the following relationship:

$$j = \lambda_p^* / R_b,$$

where $\lambda_p^*$ is a peak bit rate for the new connection and $R_b$ is the bit rate of the equivalent sources; and K, the total number of equivalent basic rate CBR sources, including the contribution from the new connection is determined according to:

$$K = j + \frac{\sum_{i=1}^{n} \lambda_p^i}{R_b},$$

where n is the number of CBR connections that are already admitted by the switch and $\lambda_p^i$ is the peak bit rate for the CBR connection i (i=1, 2, . . . n).

7. The multi-class connection admission control method according to claim 6 wherein said additional capacity, $\Delta_{cbr}$, is determined according to the following relationship:

$$\Delta_{cbr} = C_{cbr}^{new} - C_{cbr}^{old},$$

wherein $C_{cbr}^{new}$ is the capacity required for the particular CBR class after the new connection is accepted and $C_{cbr}^{old}$, is the capacity of the particular CBR class before the new connection is accepted and $$C_{cbr}^{new} = \max(K*R_b, C_{cbr}^{delay}, C_{cbr}^{loss})$$

wherein $$C_{cbr}^{delay} = \frac{2*K*\left(a + K*R_b\frac{t_{max}}{b}\right)}{K + \sqrt{K^2\left(1 + 4*R_b\frac{t_{max}}{b}\right) + 4a*K}} \frac{b}{t_{max}},$$

and $\alpha = -1.15*\log_{10}(\epsilon_2)$, K is the total number of equivalent sources with a rate $R_b$ and $$C_{cbr}^{loss} = \frac{K*R_b}{1 + \frac{B_{cbr}}{K} - \frac{\beta}{B_{cbr}}}$$

such that the QoS requirements of all CBR connections, including the new connection, are met.

8. The multi-class connection admission control method according to claim 5 further comprising the step of:

determining a sum of the peak rates for all existing connections according to the following:

$$\sum_{i=1}^{n} \lambda_p^i.$$

9. A multi-class connection admission control method for admitting a new available bit rate (ABR) connection to an ATM switch situated within a telecommunications network, said method comprising:

a first step of determining a minimum cell rate (MCR) requirement for the ABR connection;

a second step of determining, based upon the ABR connection's MCR requirement, whether there is sufficient available bandwidth in a bandwidth free pool for the connection in a forward direction;

a third step of determining whether there is sufficient available bandwidth for resource management (RM) cell transmission for the connection in a reverse direction;

a fourth step of admitting the new connection to the telecommunications network if there is sufficient bandwidth for the connection in the forward direction and reverse direction as determined in the second and third steps, respectively, else rejecting the connection; and a fifth step of assigning, if the connection is admitted, a peak cell rate (PCR), an initial cell rate (ICR), and a rate increase factor (RWF) for the new connection.

10. The multi-class connection admission control method according to claim 9 wherein said sufficient available bandwidth for resource management (RM) cell transmission for the connection in a reverse direction is obtained according to the following relationship:

$$C_{rm} = \left[\frac{C_{abr}^{max} - \sum_{i=1}^{K} \lambda_{mcr}^i}{K}\right] * \sum_{i=1}^{K} \frac{1}{n_{rm}^i} + \sum_{i=1}^{K} \frac{\lambda_{mcr}^i}{n_{rm}^i}.$$

11. The multi-class connection admission control method according to claim 10 wherein said PCR is obtained according to the following relationship:

$$PCR = C_{link} - \sum_{cbr} \lambda_p^{cbr} - \sum_{vbr} \lambda_s^{vbr}.$$

12. The multi-class connection admission control method according to claim 11 wherein said ICR is obtained according to the following relationship:

$$ICR_{nom} = \frac{B_1}{M * RTT_{nom}}.$$

13. The multi-class connection admission control method according to claim 12 wherein said RIF is obtained according to the following relationship:

$$RIF = \frac{2 * Nrm\left(\frac{B_2}{M \cdot ICR} - T_{det} - RTT_{nom}\right)}{(T_{det} + RTT_{nom})^2 \cdot PCR}.$$

14. A multi-class connection admission control method for admitting a new variable bit rate (VBR) connection to an ATM switch situated within a telecommunications network, said method comprising:

a first step of determining UPG descriptors and QoS requirements for the VBR connection wherein said QoS requirements include GLR and GDV;

a second step of constructing, from the UPC descriptors an on/off process for the VBR connection;

a third step of constructing, based upon the on/off process, a modified source model;

a fourth step of determining, based upon a statistical multiplexing model, any additional capacity required to support the VBR connection;

a fifth step of determining, in parallel with above third and fourth steps and based upon a buffered lossless multiplexing model, any additional capacity required to support the VBR connection; and a sixth step of determining, based upon the additional capacity requirements determined in steps four and five, additional capacity required to support the VBR connection.

15. The multi-class connection admission control method according to claim 14 wherein said UPC descriptors are $\lambda_p$, $\lambda_s$, $B_s$, where $\lambda_p \geq \lambda_s$, and $B_s \geq 1$ and the QoS requirements are cell loss ratio CLR and cell delay variation CDV which are determined according to the following relationships:

$$CLR < \epsilon_1, \text{ and}$$

$$Prob[CDV > t_{max}] < \epsilon_2.$$

16. The multi-class connection admission control policy according to claim 15 wherein said on/off process is an equivalent source traffic model determined according to:

$$T_{on}^* = \frac{B_s^*}{\lambda_p^*} \text{ and } T_{off}^* = \frac{B_s^*}{\lambda_p^*} \frac{(\lambda_p^* - \lambda_s^*)}{\lambda_s^*}, \text{ and}$$

$$P_{on}^* = \frac{T_{on}^*}{T_{on}^* + T_{off}^*} = \frac{\lambda_s^*}{\lambda_p^*}.$$

17. The multi-class connection admission control policy according to claim 16 wherein said modified source model is determined according to the following:

$$T_n = \frac{B_{vbr}}{2 * C_{vbr}^{max}},$$

$$\lambda_H^* = \min\left(1, \frac{T_{on}^*}{T_N}\right)\lambda_p^* + \max\left(0, 1 - \frac{T_{on}^*}{T_N}\right)\lambda_s^*, \text{ and}$$

$$\lambda_L^* = \max\left(0, 1 - \frac{T_{on}^*}{T_N}\right)\lambda_s^*.$$

18. The multi-class connection admission control policy according to claim 17 wherein said fourth step determination of additional capacity is determined according to:

$$C_{vbr}^{new} = \overline{M_{new}} + \varsigma * \sigma_{new} \text{ where}$$

$$\overline{M}_{new} = \overline{M}_{old} + \lambda_s^*,$$

$$\sigma_{new}^2 = \sigma_{old}^2 + (\lambda_H^* - \lambda_L^*)^2 P_{on}^*(1 - P_{on}^*) \text{ where}$$

$$\eta = \frac{\overline{M}_{new}\sqrt{2\pi}}{\sigma_{new}} \varepsilon,$$

and $$\zeta = \frac{C - \overline{M}_{new}}{\sigma_{new}},$$

$$\varsigma = \sqrt{2\left(-\log(-2\eta\log(\eta)) - \log\left(1 - \frac{\log(-2\log(\eta))}{1 - \log(\eta)}\right)\right)}$$

$$\approx 1.8 - 0.46\log_{10}(\eta).$$

19. The multi-class connection admission control policy according to claim 18 wherein said fifth step determination of additional capacity is determined according to:

$$C_{vbr}^{new} = \max\left(\left(\lambda_p^* + \sum_{i=1}^{n}\lambda_p^i\right)\left(1 - \frac{B_{vbr}}{B_s^* + \sum_{i=1}^{n} B_s^i}\right)^+, \lambda_s^* + \sum_{i=1}^{n}\lambda_s^i\right).$$

20. The multi-class connection admission control policy according to claim 19 wherein said sixth step determination of the additional capacity is determined according to:

$$\Delta_{vbr} = \min[\delta_1, \delta_2], \text{ where}$$

$\delta_1 = C_{vbr}^{new} - C_{vbr}^{old}$, is the additional capacity determined in step four and $\delta_2 = C_{vbr}^{new} - C_{vbr}^{old}$ is the additional capacity determined in step five.

21. A multi-class connection admission control method for admitting a new, measurement based, variable bit rate (VBR) connection to an ATM switch situated within a telecommunications network, said method comprising:

a first step of determining UPC descriptors and QoS requirements for the VBR connection wherein said QoS requirements include CLR and CDV;

a second step of constructing, from the UPC descriptors an on/off process for the VBR connection;

a third step of constructing, based upon the on/off process, a modified source model;

a fourth step of determining, based upon a statistical multiplexing model, any additional capacity required to support the VBR connection;

a fifth step of determining, in parallel with above third and fourth steps and based upon a buffered lossless multiplexing model, any additional capacity required to support the VBR connection;

a sixth step of determining, based upon the additional capacity requirements determined in steps four and five, additional capacity required to support the VBR connection; and a seventh step of measuring, once the connection is admitted, a current cell arrival rate and cell loss ratio periodically and updating a parameter at that period according to the following relationship:

$$k_1 = \begin{cases} \max(a_1, K_{l=1}/\alpha), \text{ if } \frac{CLR_{max}^i}{CLR_{tar}} < \varepsilon, \\ \min(a_1, \beta * k_{l-1}), \text{ if } \frac{CLR_{mes}^i}{CLR_{tar}} \geq \varepsilon \end{cases}$$

where $A_1, A_2, \ldots, A_n, A_{n+1}, \ldots$, are the measurement periods, $CLR^n_{mes}$ is a cell loss ratio measured during period $A_n$, $k_n$ is a smoothing parameter chosen after period $A_n$, and $CLR_{tar}$ is a QoS required by the connections and $\epsilon < 1$, $\alpha$, $/3 > 1$.

22. The multi-class connection admission control method according to claim 21 further comprising:

an eighth step of updating a measured mean and variance of the cell arrival rate after a certain number of measurement periods.

23. The multi-class connection admission control method according to claim 22 further comprising:

a ninth step of determining a new mean and variance of the aggregate arrival process due to all existing VBR connections according to the following relationships:

$$\overline{M}_{new} = k\overline{M}_{old}(cac) + (1-k)\overline{M}_{old}(mes) + \lambda_s^*, \sigma_{new}^2 = (1-k)\sigma_{old}^2(mes) + KT_{old}^2(cac)(\lambda_H^* - \lambda_L^*)^2 P_{on}^*),$$

where $0 \leq k \leq 1$, $\overline{M}_{old}(cac)$ and $\sigma_{old}^2(cac)$ are the mean and variance in the aggregate arrival rate of existing connections as computed from the declared UPC parameters, $\overline{M}_{old}(mes)$ and $\sigma_{old}^2(mes)$ are the mean and variance in the aggregate arrival rate of existing connections obtained from measurements, and k is a smoothing parameter.

24. The multi-class connection admission control method according to claim 23 further comprising:

a tenth step of determining a required bandwidth for the VBR connection according to the following relationships:

$$\eta = \frac{\overline{M}_{new}\sqrt{2\pi}}{\sigma_{new}} \varepsilon,$$

$$\varsigma = \sqrt{2\left(-\log(-2\eta\log(\eta)) - \log\left(1 - \frac{\log(-2\log(\eta))}{1 - \log(\eta)}\right)\right)}$$

$$\approx 1.8 - 0.46\log_{10}(\eta), \text{ and}$$

$$C_{vbr}^{new} = \overline{M}_{new} + \varsigma * \sigma_{new}.$$

25. The multi-class connection admission control policy according to claim 24 further comprising the step of:

Admitting the VBR connection, if a sufficient bandwidth is available in a bandwidth free pool and $$\frac{CLR_m}{CLR_{tar}} < n.$$

26. The multi-class connection admission control method according to claim 1 further comprising the steps of:

accepting said incoming CBR connection if the additional capacity is available in a free pool of available capacity and if a total capacity allocated to a particular CBR class does not exceed a maximum capacity limit for said particular CBR class established by a network management system; and reducing the free pool of available capacity by an amount of the additional capacity added to the current capacity for said particular CBR class.

* * * * *

UNITED STATES PATENT AND TRADEMARK OFFICE
CERTIFICATE OF CORRECTION

PATENT NO.     : 6,046,981                                   Page 1 of 2
DATED          : April 4, 2000
INVENTOR(S)    : Ramamurthy, Gopalakrishnan, Ren, Qiang It is certified that error appears in the above-identified patent and that said Letters Patent is hereby corrected as shown below:

Column 5,
Line 60, delete "clas s" insert -- class --.

Column 9,
Line 40, delete "Oa I G X"

Column 13,
Lines 23 and 24, delete the 1st occurrence of :

$$\lambda_H^* = \min\left(1, \frac{T_{on}^*}{T_N}\right)\lambda_p^* + \max\left(0.1 - \frac{T_{on}^*}{T_N}\right)\lambda_r^*$$

Lines 23 and 24, insert -- (23) --.
Line 43, delete "(0)" insert -- (↑) --.

Column 15,
Line 48, delete "cfp" insert -- $C_{fp}$ --.

Column 18,
Lines 21 and 22, insert -- (34) -- for equation 34

Column 19,
Line 20, delete "Clink" insert -- $C_{link}$ --.
Line 25, delete "$\lambda_p$*" insert -- $\lambda_p^*$ --.
Line 26, delete "$T_{on}$*" insert -- $T_{on}^*$ --.

UNITED STATES PATENT AND TRADEMARK OFFICE
CERTIFICATE OF CORRECTION

PATENT NO. : 6,046,981
DATED : April 4, 2000
INVENTOR(S) : Ramamurthy, Gopalakrishnan, Ren, Qiang It is certified that error appears in the above-identified patent and that said Letters Patent is hereby corrected as shown below:

Column 26,
Line 49, delete "UPG" insert -- UPC --.

Column 28,
Line 41, delete "/3" insert -- B --.

Signed and Sealed this

Thirteenth Day of November, 2001

Attest:

NICHOLAS P. GODICI
Attesting Officer
Acting Director of the United States Patent and Trademark Office